United States Patent
Couleaud et al.

(10) Patent No.: US 9,313,527 B2
(45) Date of Patent: Apr. 12, 2016

(54) MANAGEMENT OF ENTERTAINMENT CONTENT DISTRIBUTED ACROSS SMART WIRELESS ACCESS POINTS OF IN-FLIGHT ENTERTAINMENT SYSTEM

(71) Applicant: Thales Avionics, Inc., Irvine, CA (US)

(72) Inventors: Jean-Yves Couleaud, Mission Viejo, CA (US); Tracy Decuir, Yorba Linda, CA (US); John Howard Darvell, Claremont, CA (US)

(73) Assignee: Thales Avionics, Inc., Irvine, CA (US)

( * ) Notice: Subject to any disclaimer, the term of this patent is extended or adjusted under 35 U.S.C. 154(b) by 40 days.

(21) Appl. No.: 14/483,779

(22) Filed: Sep. 11, 2014

(65) Prior Publication Data

US 2015/0245109 A1 Aug. 27, 2015

Related U.S. Application Data

(60) Provisional application No. 61/942,711, filed on Feb. 21, 2014.

(51) Int. Cl.
| | |
|---|---|
| *H04N 21/214* | (2011.01) |
| *H04N 21/232* | (2011.01) |
| *H04N 21/274* | (2011.01) |
| *H04N 21/414* | (2011.01) |
| *H04N 21/63* | (2011.01) |
| *H04N 21/647* | (2011.01) |
| *H04N 21/4363* | (2011.01) |
| *H04N 21/231* | (2011.01) |
| *H04N 21/258* | (2011.01) |
| *H04N 21/262* | (2011.01) |

(52) U.S. Cl.
CPC ..... *H04N 21/2146* (2013.01); *H04N 21/23109* (2013.01); *H04N 21/25841* (2013.01); *H04N 21/26291* (2013.01); *H04N 21/41422* (2013.01); *H04N 21/43637* (2013.01); *H04N 21/64784* (2013.01)

(58) Field of Classification Search
None
See application file for complete search history.

(56) References Cited

U.S. PATENT DOCUMENTS

| | | | | |
|---|---|---|---|---|
| 2009/0077595 | A1* | 3/2009 | Sizelove | G06F 1/1626 725/76 |
| 2011/0174926 | A1* | 7/2011 | Margis | B60N 2/4876 244/118.6 |
| 2011/0314490 | A1* | 12/2011 | Keen | H04N 7/18 725/23 |

* cited by examiner

*Primary Examiner* — Brian T Pendleton
*Assistant Examiner* — Jean D Saint Cyr
(74) *Attorney, Agent, or Firm* — Myers Bigel & Sibley, P.A.

(57) ABSTRACT

Some embodiments of the present disclosure are directed to an entertainment system that includes a plurality of wireless access points. Each wireless access point includes a mass memory, at least one radio transceiver, and at least one processor. The at least one radio transceiver is configured to communicate with seat display devices. The at least one processor is configured to receive entertainment content comprising a plurality of content items, and store the entertainment content in the mass memory. The at least one processor selects a subset of content items from among the content items of the entertainment content stored in the mass memory, based on a defined rule, and downloads the subset of content items from the mass memory to a plurality of the seat display devices through the at least one radio transceiver for local storage within mass memory of the seat display devices.

24 Claims, 12 Drawing Sheets

Smart Wireless Access Point (SWAP)
System Architecture

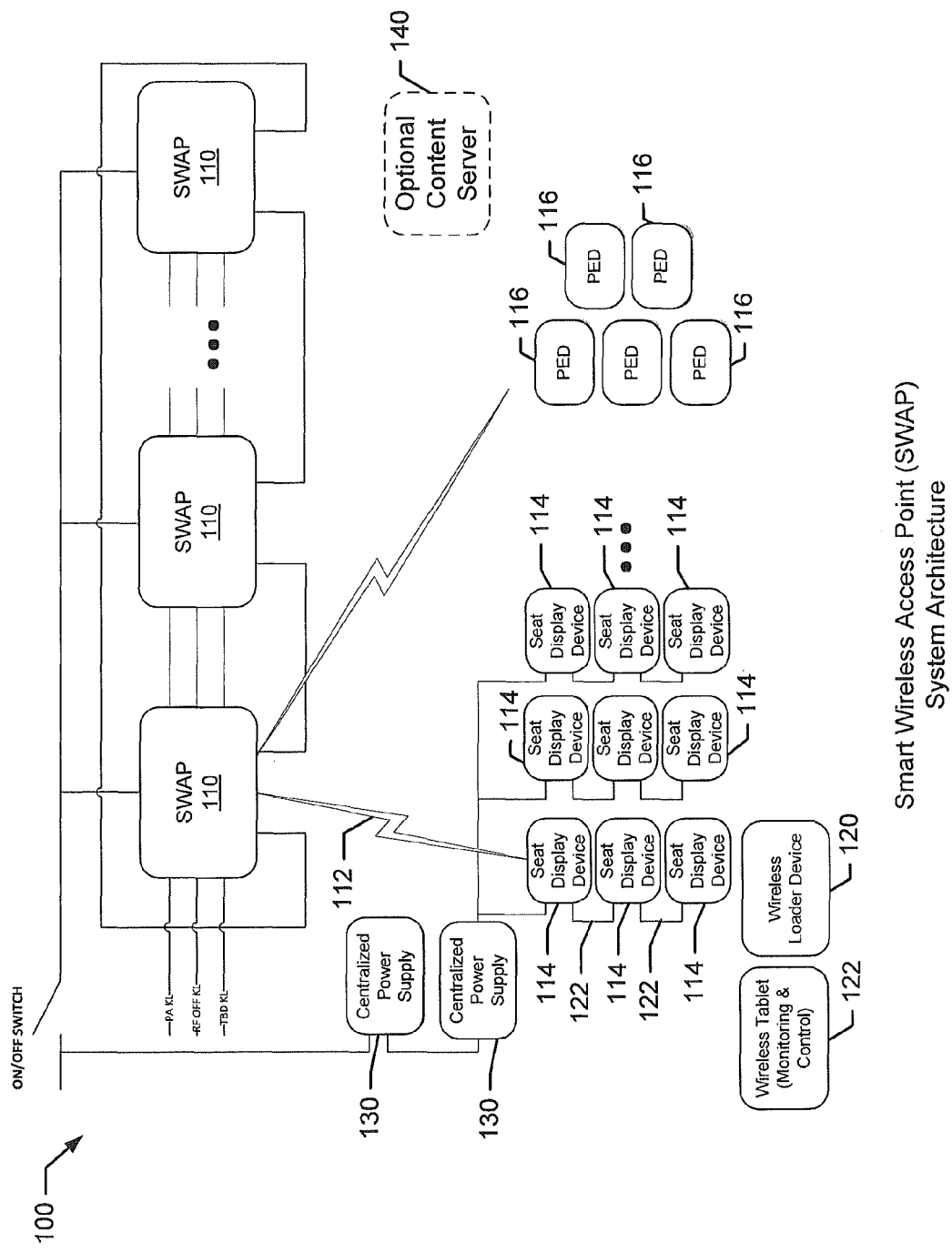

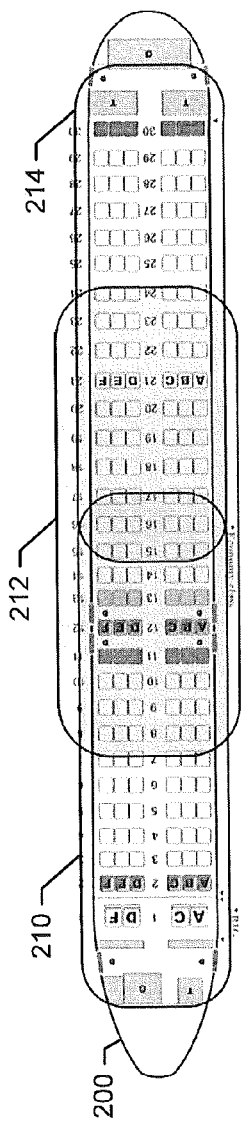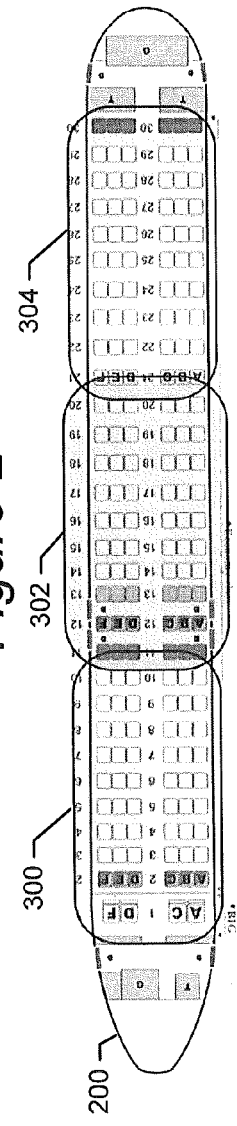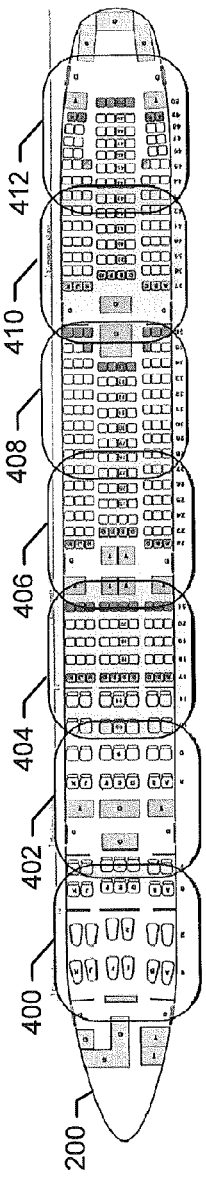
Figure 2 Communication Service Areas Provided by 3 Convention WAPS (PRIOR ART)
Figure 3 Communication Service Areas Provided by 3 SWAPS
Figure 4 Communication Service Areas Provided by 7 SWAPS in Dense Communication Environment Allocate resources of the radio transceiver(s) to provide a quality of service to the file transfer protocol downloading of the entertainment content to the seat display devices that is insufficient to support real time viewing during the file transfer protocol downloading of the entertainment content while concurrently providing a quality of service the streaming of the requested content items through the radio transceiver(s) to the requesting personal electronic devices that is sufficient to support real time viewing during the streaming of the requested content items — 800

FIGURE 8

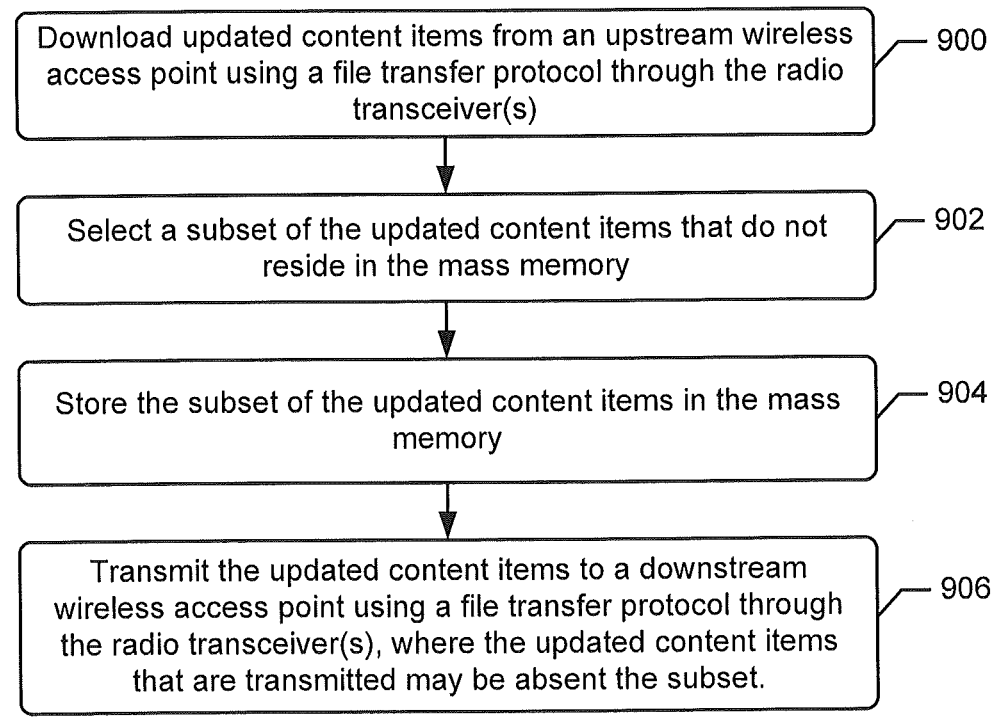

Download updated content items from an upstream wireless access point using a file transfer protocol through the radio transceiver(s) — 900

Select a subset of the updated content items that do not reside in the mass memory — 902

Store the subset of the updated content items in the mass memory — 904

Transmit the updated content items to a downstream wireless access point using a file transfer protocol through the radio transceiver(s), where the updated content items that are transmitted may be absent the subset. — 906

FIGURE 9

MANAGEMENT OF ENTERTAINMENT CONTENT DISTRIBUTED ACROSS SMART WIRELESS ACCESS POINTS OF IN-FLIGHT ENTERTAINMENT SYSTEM

CROSS-REFERENCE TO RELATED APPLICATION

This application claims priority to U.S. Provisional Application No. 61/942,711, filed Feb. 21, 2014, the disclosure and content of which is incorporated herein by reference in its entirety as if set forth fully herein.

TECHNICAL FIELD

The present disclosure relates to vehicle entertainment systems and, more particularly, in-flight entertainment systems.

BACKGROUND

In-flight entertainment (IFE) systems are deployed onboard aircraft to provide entertainment services for passengers in a passenger cabin. The IFE systems typically provide passengers with television and audio multimedia entertainment programming.

One type of IFE system is a "server centric" architecture where multimedia content is located on a server or a set of servers installed in an electronic bay somewhere in the airplane. Video content is played through displays installed at overhead locations or within seatbacks, and associated audio content is played through jacks provided in seat armrests.

Another type of IFE system is a "seat centric" architecture where content is stored in mass data storage devices located at individual seats and played through associated seat displays. The server (or set of servers) acts as an injection point for content that will be later installed locally into the seat mass data storage devices, and also acts as a secondary source for content that may not fit in the seat mass data storage devices.

Cabin crew (e.g., flight attendants) can operate control panels to control the IFE entertainment system. The control panels can include computer monitors and optional peripherals installed at spaced apart locations within the cabin that are accessible to the cabin crew during flight operations.

There has also been an emergence of wireless systems providing connectivity to passenger devices (i.e. Internet access) as well as limited streaming entertainment (i.e. movies). These systems typically require less installation effort and are limited to using servers installed in electronic bays somewhere in the airplane that stream content and communication control commands through wireless access points installed at spaced apart locations in overhead compartments of the airplane.

IFE installations can use substantial aircraft resources, such as equipment bay space, electrical power, weight, and cost. Each of the seat devices of an IFE system are typically networked through lengthy, heavy, and costly data network cabling to one or more servers to communicate commands and receive content.

Because of these components and network cabling, each IFE system is customized to each particular aircraft layout, referred to as a Layout of Passenger Accommodations (LOPA). Differences in architectures and layouts of IFE systems between aircraft necessitates separate and independent testing and verification by IFE vendors and customers.

In addition, structural supports need to be designed and installed in the aircraft fuselage to support the IFE system components (e.g., server(s)), which is a major contributor to the overall weight of the IFE system. Control panels and network cabling are also a major contributors to overall weight because of the structures that are needed for their support.

The processes for accessing equipment bays where servers are typically installed are complicated and require highly trained technicians. Moreover, costly and lengthy processes may be necessary to obtain airplane manufacturer/owner approvals for modification of equipment bays for IFE system components. Also, data network paths need to be created between electronic bays and the cabin where seat displays are located, the long runs of network cable are inherently heavy and costly.

When a wireless communication system is installed on-board an airplane, wireless access points can be configured and spaced apart along the cabin to reduce interference with each other. Avoiding excessive interference limits the total number of wireless access points that can be installed in an airplane and constrains the available communication bandwidth and number of clients that can be served.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

Some embodiments of the present disclosure are directed to an entertainment system that includes a plurality of wireless access points. Each wireless access point includes a mass memory, at least one radio transceiver, and at least one processor. The at least one radio transceiver is configured to communicate with seat display devices. The at least one processor is configured to receive entertainment content comprising a plurality of content items, and store the entertainment content in the mass memory. The at least one processor selects a subset of content items from among the content items of the entertainment content stored in the mass memory, based on a defined rule, and downloads the subset of content items from the mass memory to a plurality of the seat display devices through the at least one radio transceiver for local storage within mass memory of the seat display devices.

In some further embodiments, the wireless access points operate to provide dynamic content library management. Content items stored in the mass memory of seat display devices are updated based on completed travel route, next travel route, changes in passenger viewing preferences, passenger itineraries, and/or according to other defined rules. The content items that are available from any one of the wireless access points for download to seat display devices and/or for streaming to personal electronic devices are not restricted to which content items are presently contained in its mass memory, but instead can include content items that the wireless access point can obtain from other wireless access points.

Other systems, apparatus, and methods according to embodiments of the present disclosure will be or become apparent to one with skill in the art upon review of the following drawings and detailed description. It is intended that all such additional systems, apparatus, and methods be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 1 illustrates an IFE system that includes Smart Wireless Access Points (SWAPs) that are configured according to some embodiments of the present invention;

FIG. 2 illustrates wireless communication coverage areas provided by three conventional WAPs within an aircraft fuselage;

FIG. 3 illustrates the operation of three SWAPs that are configured to operate to provide substantially non-overlapping coverage areas in accordance with some embodiments of the present disclosure;

FIG. 4 illustrates the operation of seven SWAPs that are configured to operate to provide substantially non-overlapping coverage areas in a dense communication environment in accordance with some embodiments of the present disclosure;

FIGS. 6-13 and 15-17 are flowcharts of operations and methods that may be performed by one or more SWAPs of an entertainment system in accordance with some embodiments of the present disclosure;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of IFE systems are disclosed that can provide one or more of the following advantages and solutions:

Reduce/eliminate seat network cabling using wireless communication networks;

Provide wireless mobile terminals configured to operate as crew control panels for IFE systems;

Integrate content server capabilities into wireless access points which may be installed in the overhead section of the airplane, and which may reduce the cost and weight of the IFE system;

Provide equipment and operations for wirelessly loading content onto seat IFE devices, which can eliminate the need for seat to seat data networks and thereby simplify installation and reduce weight of the IFE system; and Provide dynamic control over service areas of the wireless access points to allow more wireless access points to be installed in a cabin, and increase the number of available communication frequencies that can be used by each of the wireless access points within a cabin while providing acceptable levels of interference between the wireless access points.

Although various embodiments are explained herein in the context of entertainment systems for an In-Flight Entertainment (IFE) environment of an aircraft, other embodiments of the entertainment systems are not limited thereto and may be used in other types of vehicles, including ships, buses, trains, and automobiles, and for non-vehicle installations for conference centers, buildings, etc.

Smart Wireless Access Point (SWAP)

FIG. 1 illustrates an IFE system 100 that includes Smart Wireless Access Points (SWAPs) 110. The term "SWAP" is used herein in a non-limiting manner. A SWAP is more broadly also referred to as a wireless access point is configured to communicate through a wireless interface communication link with a plurality of seat display devices and/or personal electronic devices. A SWAP or wireless access point may be used within an entertainment system or other communication system according to various embodiments disclosed herein.

The SWAPs 110 can be deployed (mounted) at spaced apart locations within an aircraft fuselage to provide corresponding wireless service areas to seat display devices 114 and personal electronic devices (PEDs) 116. The PEDs 116 which may correspond to any personal electronic device having wireless communications capabilities that can be carried by a passenger onto an aircraft, including, without limitation, tablet computers, laptop computers, palmtop computers, cellular smart phones, media players, etc.

Figure 5:
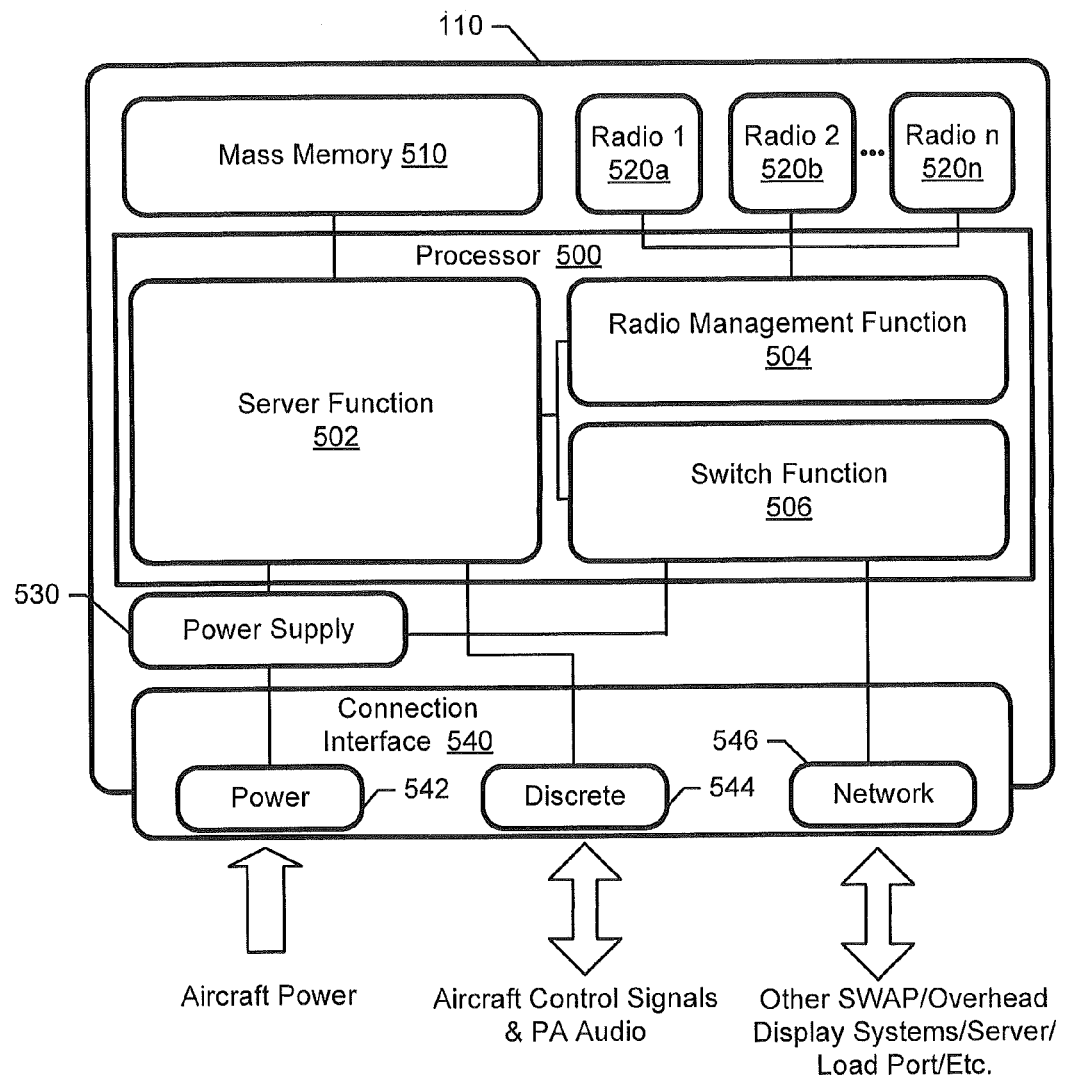
FIG. 5 is a block diagram of a SWAP configured according to some embodiments of the present disclosure.
Figure 6:
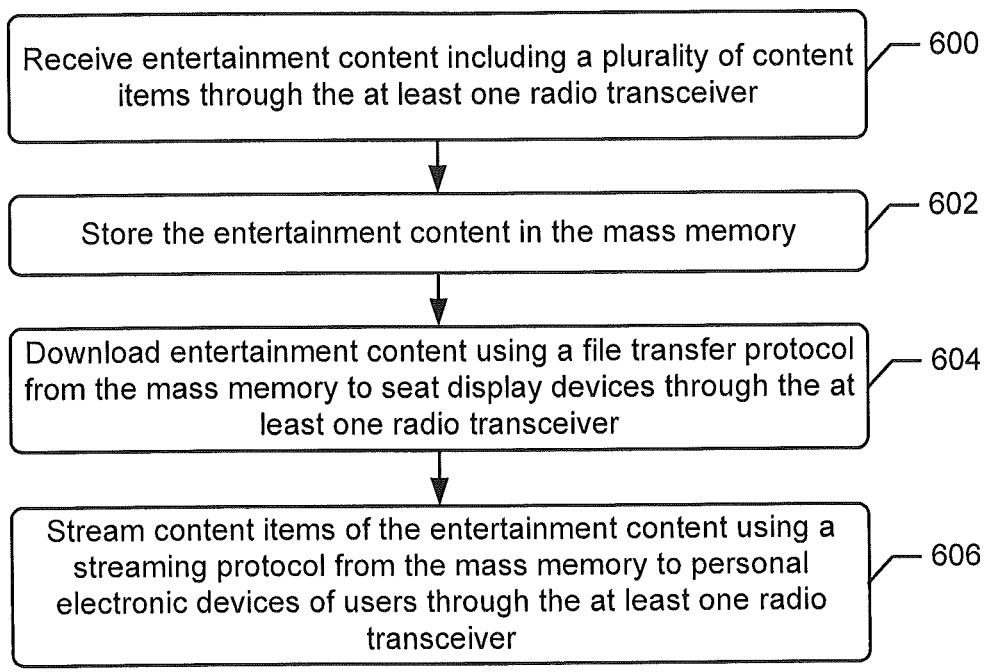

Each SWAP 110 is configured to store content within a mass data storage device (mass memory) and to communicate content from the mass memory through a wireless communication link 112 to memory (mass memory) within each of the seat display devices 114. In the embodiments of FIGS. 5 and 6, each wireless access point includes a mass memory 510, at least one radio transceiver 520, and a processor 500. The at least one radio transceiver 520 configured to communicate with the seat display devices 114 and to communicate with personal electronic devices 116 of users. The processor 500 is configured to receive (block 600) entertainment content comprising a plurality of content items through the at least one radio transceiver. The processor 500 stores (block 602) the entertainment content in the mass memory 510. The processor 500 downloads (block 604) entertainment content using a file transfer protocol from the mass memory 510 to the seat display devices 114 through the at least one radio transceiver 520, and streams (block 606) content items of the entertainment content using a streaming protocol from the mass memory 510 to the personal electronic devices 116 of users through the at least one radio transceiver 520.

The processor 500 controls where content is distributed, when content is distributed, and the relative prioritization of the receipt of content into the associated SWAP 110 and distribution of content to the various seat display devices 114 and personal electronic devices 116.

In one embodiment, the processor 500 allocate resources of a plurality of radio transceivers 520 so that content is communicated to the seat display devices 114 at a quality of service that is not necessarily sufficient to support real-time streaming display on the seat display devices 114. For example, the content may be communicated to the seat display devices 114 as a background communication task having insufficient bandwidth, excessive delay in delivery of content packets, excessive bit error rate, and/or excessive packet retransmission delays to support real-time streaming of video that would provide an acceptable quality when displayed on the seat display devices 114 (e.g., video is not interrupted, jittery, or displayed at degraded resolution due to insufficient network quality of service). The seat display device 114 may be within a seatback or armrest of each passenger seat, or the display device 114 may be installed in other locations such as within bulkheads or ceiling structures.

In sharp contrast, prior art IFE systems stream content in real-time from a server, mounted somewhere within the aircraft, through a WAP and wireless interface to passenger electronic devices. The prior art WAP did not store the content for later distribution to passenger electronic devices. Consequently, the end-to-end communication networks from the server through the WAP to the seat display devices or passenger electronic devices must have sufficient capacity to provide guaranteed high-bandwidth low latency network communications and satisfy other quality of service requirements (e.g., bit error rate, packet retransmission rate, low jitter rate, etc.). In sharp contrast to such prior art IFE systems, some embodiments of the present disclosure enable content from the mass memory of the SWAP 110 to be communicated as a background communication task (at less network bandwidth and quality of service than required for real-time streaming) to load mass memory resident in the seat display devices 114.

In one embodiment, each of the seat display devices 114 contains or is locally connected to a mass memory having sufficient data storage capacity to store a plurality of items of entertainment content, such as audio content (e.g., songs, etc.), audio-video content (e.g., movies, television programs, etc.), and/or games or other applications executable by processors of the seat display devices 114. The different audio content, audio-video content, and games or other applications are also referred to herein as content items.

A SWAP 110 downloads through a wireless interface 112 a plurality of content items to the mass memory in each of the seat display devices or is locally networked to a plurality of the seat display devices. A passenger can operate a user interface associated with the passenger's seat display device to select among the content items from the internal or local mass memory, and cause the selected content item to be played through a display and/or audio jack associated with the seat display device 114.

The user interface may further display a content item that is missing from the internal or local mass memory of the seat display device 114 but which is known to reside in the mass data storage device of the SWAP 110. Based on a passenger selecting a content item that is not stored internally or local to the seat display device 114, a command can be transmitted through the wireless interface 112 to the SWAP 110 to cause the content item to be downloaded to the internal or local mass memory of the seat display device 114 for playing to the passenger.

In another embodiment, the SWAP 110 may download passenger selected content items on-demand to individual seat display devices 114. A content item may be downloaded as a file to memory of a seat display device 114 responsive to a user request for that content item. Playback of the content item may be restricted to occurring after the file has been completely downloaded to the seat display device 114, or may be allowed to begin after a threshold amount of the file has been downloaded. The threshold amount may be defined based on characteristics of the network and the ability of the downloading to keep pace with the rate at which the content items is played from the file so as to avoid interruption of playing of the content item.

Moreover, if a passenger requested content item is missing from the SWAP 110 serving the seat display device 114, the serving SWAP 110 may obtain the content item from another SWAP 110 over a wired network and/or through a wireless link. For example, in one embodiment, the processor 500 of a SWAP 110' is further configured to respond to a user request from one of the personal electronic devices 116 and a determination that a content item identified by the user request is not stored among the entertainment content in the mass memory 510, by obtaining the content item from the mass memory 510 of another SWAP 110", storing the content item in the mass memory 510 of the obtaining SWAP 110', and streaming the content item using the streaming protocol from the mass memory 510 of the obtaining SWAP 110' through the at least one radio transceiver 520 to the one of the personal electronic devices 116.

In a similar manner, the processor 500 of a SWAP 110' can respond to a user request from one of the seat display devices 116 that identifies a content item that is not stored among the entertainment content in the mass memory 510 by obtaining the content item from the mass memory 510 of another one of the SWAP 110", storing the content item in the mass memory 510 of the obtaining SWAP 110', and streaming the content item using the streaming protocol from the mass memory 510 of the obtaining SWAP 110' through the at least one radio transceiver 520 to the one of the seat display devices 116.

In another embodiment, the SWAP 110 may stream a content item in real-time through the wireless interface 112 to a seat display device 114. Although such streaming again necessitates that the wireless interface 112 between the SWAP 110 and the seat display device 114 be configured to provide guaranteed high-bandwidth low latency network communications and satisfy other quality of service requirements for at least that single instance of real-time streaming, the system 100 can still benefit by avoiding the need for communication networks between the SWAPs 112 and any remote server(s) that support high-bandwidth low latency network communications.

Although various embodiments of SWAPs 110 can avoid the need for providing a content server within the aircraft, in some other embodiments a content server 140 is mounted within the aircraft and can be connected through a wireless interface or wired interface (e.g., Ethernet) to load content to the mass memory of the SWAPs 110. The content can be loaded by non-real-time file transfer to the SWAP 110, which can substantially reduce the bandwidth and quality of service requirements for the network connecting the content server 140 to the SWAPs 110.

A SWAP 110 may download a content item to a particular PED 116 responsive to a request message from the particular PED 116 to receive the content item. The content item may be downloaded as a file to memory of the particular PED 116 responsive to the request message for the content item, and for subsequently playback through the PED 116, or the content item may be streamed in real-time through a wireless interface.

Accordingly, the SWAP 110 may provide the same non-real-time file transfer wireless interface for download of content files to the seat display devices 114 and the PEDs 116. Alternatively, the SWAP 110 may provide a non-real-time file transfer wireless interface for download of content files to the seat display devices 114 and a different real-time wireless interface for streaming of content to the PEDs 116. Using non-real-time file transfer can allow a single SWAP 110 to provide content delivery services to a greater number of passengers via seat display devices 114 and the PEDs 116, and to perform the delivery at a higher quality and/or with less quality of service requirements being imposed on the SWAP 110.

In one embodiment, the processor 500 of each of the SWAPs 110 is further configured to prevent streaming of content items of the entertainment content to the personal electronic devices 116 until completion of the downloading of the entertainment content to the seat display devices 114. Thus, for example, when the entertainment system is part of an in-flight entertainment system within an aircraft, the available communication resources can be dedicated to quickly downloading a substantial amount of entertainment content items to the mass memory of the seat display devices 114 while the aircraft is on the ground. Thereafter, the communication resources can be used for streaming real-time video and audio to the personal electronic devices 116 without those communications being burdened with downloading of entertainment content to the seat display devices 114. Moreover, the communication bandwidth requirements for the radio transceivers 520 may be reduced and/or fewer SWAPs 110 may be capable of servicing more seat display devices 114 and/or personal electronic devices 116 by this approach of prioritizing downloading of entertainment content items to the seat display devices, such as while the aircraft is on the ground, over streaming of real-time video and audio to the personal electronic devices 116.

Instead of precluding simultaneous downloading of entertainment content items to the seat display devices and streaming of content to the personal electronic devices 116, the processor 500 of each of the SWAPs 110 can be configured to prioritize one over the other in order to ensure that the content streaming is provided with a sufficient quality of service that is acceptable for real-time viewing or other use of the content.

Figure 7:
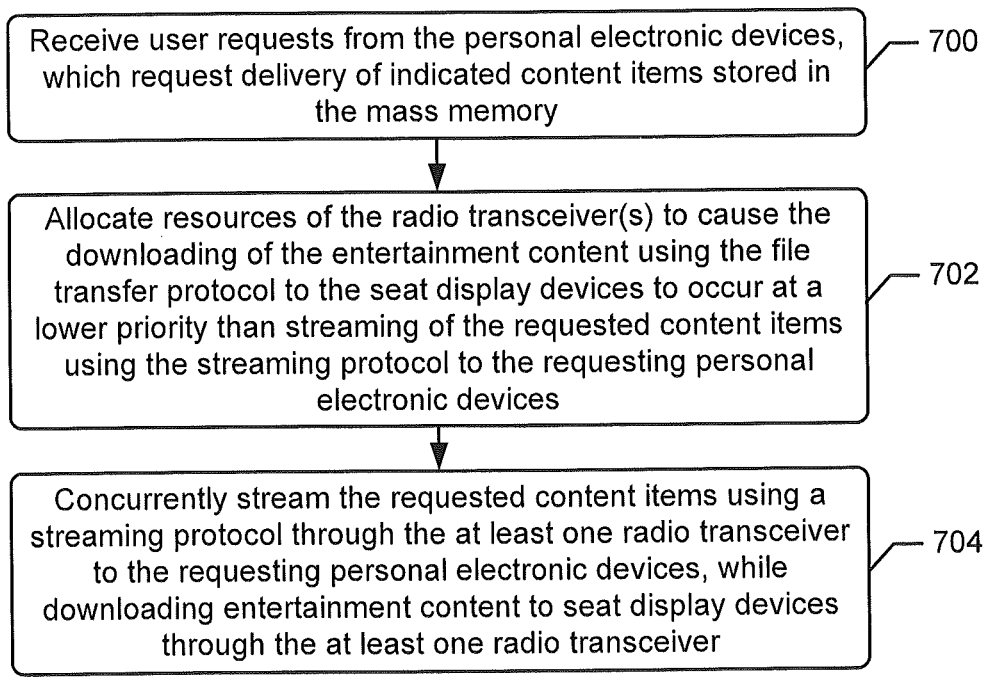

Referring to the embodiment of FIG. 7, the processor 500 of each of the SWAPs 110 can be configured to receive (block 700) user requests from the personal electronic devices 116, where each user request from the personal electronic devices 116 requests delivery of a respectively indicated one of the content items stored in the mass memory 510 of the respective SWAP 110. The processor 500 can allocate (block 702) resources of the at least one radio transceiver 520 to cause the downloading of the entertainment content using the file transfer protocol through the at least one radio transceiver 520 to the seat display devices 114 to occur at a lower priority than the concurrent streaming of the requested content items using the streaming protocol through the at least one radio transceiver 520 to the requesting personal electronic devices 116. The processor 500 can concurrently stream (block 704) the requested content items using a streaming protocol through the at least one radio transceiver 520 to the requesting personal electronic devices 116, while downloading entertainment content to seek display devices through the at least one radio transceiver 520.

More particularly, in the further embodiment of FIG. 8, the processor 500 can allocate (block 800) resources of the at least one radio transceiver to provide a quality of service to the file transfer protocol downloading of the entertainment content to the seat display devices that is insufficient for real time viewing during the file transfer protocol downloading of the entertainment content while concurrently providing a quality of service to the streaming of the requested content items through the at least one radio transceiver to the requesting personal electronic devices that is sufficient for real time viewing during the streaming of the requested content items The plurality of SWAPs 110 can be communicatively connected in a series. For example, when the entertainment system is part of an in-flight entertainment system within an aircraft, a SWAP 110 mounted near a front of the aircraft fuselage may be configured to communicate with a nearest neighbor SWAP 110 mounted apart in the fuselage, but not be configured to communicate with more distant SWAPs 110 spaced apart further back in the fuselage. When connected in such series fashion, each of the SWAPs 110 may be configured to receive entertainment content from an upstream SWAP 110 (e.g., a SWAP located further forward in the fuselage) and to relay that entertainment content to a downstream SWAP 110 (e.g., a SWAP located further back in the fuselage). In this manner, entertainment content that is loaded onto, for example, a first SWAP 110 within the fuselage can be automatically distributed to the next SWAP 110 and so on to load the entertainment content onto the other SWAPs 110 within the fuselage.

In the embodiment of FIG. 9, the processor 500 of at least some of the SWAPs 110 is further configured to download (block 900) updated content items from an upstream SWAP 110 using a file transfer protocol through the at least one radio transceiver 520. The processor 500 selects (block 902) a subset of the updated content items that do not reside in the mass memory, stores (block 904) the subset of the updated content items in the mass memory, and transmits (block 906) the updated content items to a downstream SWAP 110 using a file transfer protocol through the at least one radio transceiver 520.

The updated content items that are transmitted (block 906) may be absent from the subset of the updated content items. The SWAPs 110 may operate to reduce redundancy of the content items that are stored in the mass memories of the different SWAPs 110 but transmitting to a downstream SWAP 110 a group of the updated content items that does not include what they locally stored in their own mass memories. Thus, for example, a first SWAP 110 may store as many of the updated content items in its local mass memory until a threshold remaining capacity is reached, and may then forward the remaining (not yet stored) updated content items to a downstream second SWAP 110.

In a further embodiment, a wireless loader device 120 operates to load a plurality of content items from its mass data storage device to the mass data storage device of a SWAP 110. The wireless loader device 120 may be configured to concurrently load content items into a plurality of SWAPs 110. Alternatively, a plurality of wireless loader devices 120 may be paired with a corresponding plurality of SWAPs 110 to load content items (e.g., 3 wireless loader devices 120 are used to concurrently load content into 3 SWAPs 110). The wireless loader device 120 may, for example, include a laptop computer or tablet computer.

The wireless loader device 120 may also load operational software to the SWAP 110 to update operation of the SWAP 110 and/or for relay to the seat display devices 114 to update their operation. The wireless loader device 120 may be portable or transportable so that it can be carried onto an aircraft or other vehicle to update content in a SWAP 110. For example, the processor 500 of at least ones of the SWAPs 110 is further configured to download operational software from the wireless mobile loader device 120 using a file transfer protocol through the at least one radio transceiver 520, and transmit the operational software to a downstream SWAP 110 using a file transfer protocol through the at least one radio transceiver 520, and transmit the operational software to the seat display devices 114 using a file transfer protocol through the at least one radio transceiver 520. The seat display devices 114 can then operate to update their operational software.

Figure 10:
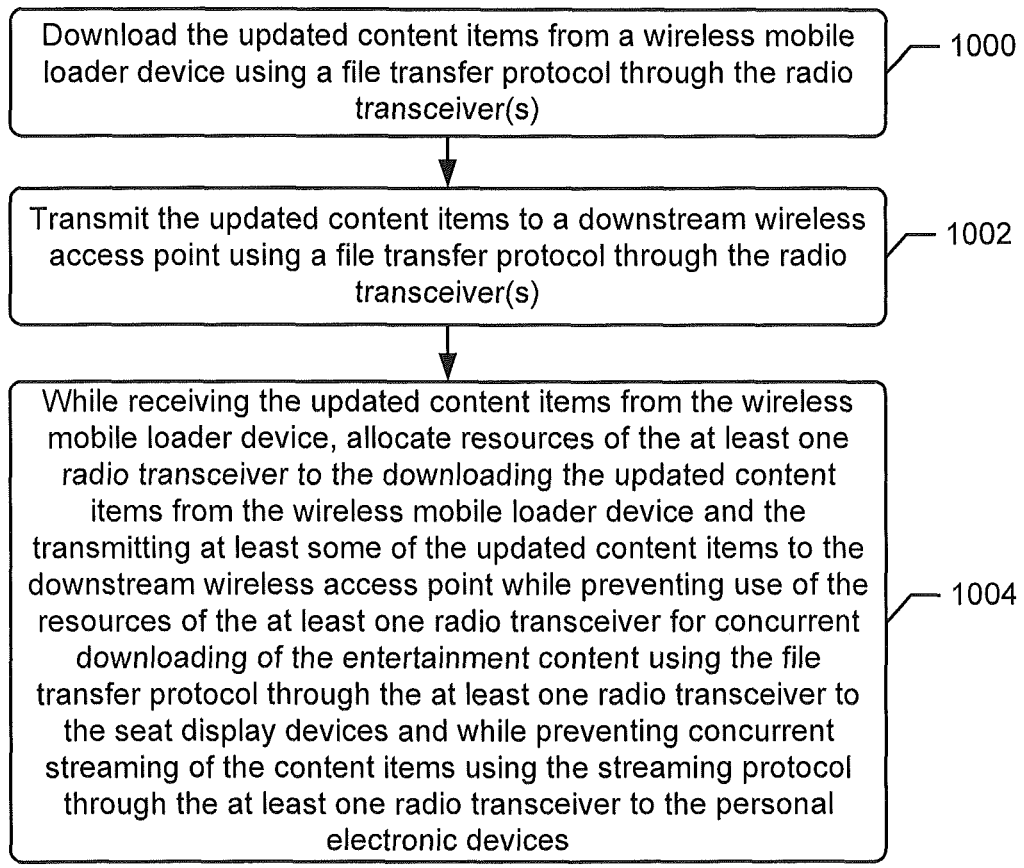

In the embodiment of FIG. 10, the processor 500 of at least some of the SWAPs 110 is further configured to download (block 1000) the updated content items from a wireless mobile loader device 120 using a file transfer protocol through the at least one radio transceiver 520, and transmits (block 1002) the updated content items to a downstream SWAP 110 using a file transfer protocol through the at least one radio transceiver 520. While receiving the updated content items from the wireless mobile loader device 120, the processor 500 can allocate (block 1004) resources of the at least one radio transceiver 520 to the downloading the updated content items from the wireless mobile loader device 120 and the transmitting the updated content items to the downstream SWAP 110 while preventing use of the resources of the at least one radio transceiver 520 for concurrent downloading of the entertainment content using the file transfer protocol through the at least one radio transceiver 520 to the seat display devices 114 and while preventing concurrent streaming of the content items using the streaming protocol through the at least one radio transceiver 520 to the personal electronic devices 116. As explained above, the processor may download all or at least selected ones of the updated content items to the downstream SWAP 110.

The wireless loader device 120 may have sufficient communication range to be able to simultaneously load content items on a plurality of the SWAPs 110. Alternatively, the wireless loader device 120 may load content items onto one of the SWAPs 110, which in turn can relay the content items to one or more other SWAPs 110 through a wired network interface 546 (e.g., network interface 546 in FIG. 3) to distribute the content among the SWAPs 110.

Content may alternatively or additionally be distributed from one SWAP 110 to one or more other SWAPs 110 through one or more radio transceivers (e.g., transceivers 520a, 520b, . . . 520n in FIG. 3), as explained above regarding FIG. 9. When a SWAP 110 is distributing content items to one or more other SWAPs 110, it may distribute all of the content items that it received from the wireless loader device 120 or it may identify particular ones of the content items that are missing from another identified SWAP 110 and distribute only the missing ones of the content items to the other identified SWAP 110.

In a further embodiment, the loader device 120 may download the updated content items through communication interface (e.g., USB interface) or wired network (e.g., Ethernet) directly into one of the SWAPs 110 for relay to the other SWAPs 110 through a wireless or wired network.

Figure 11:
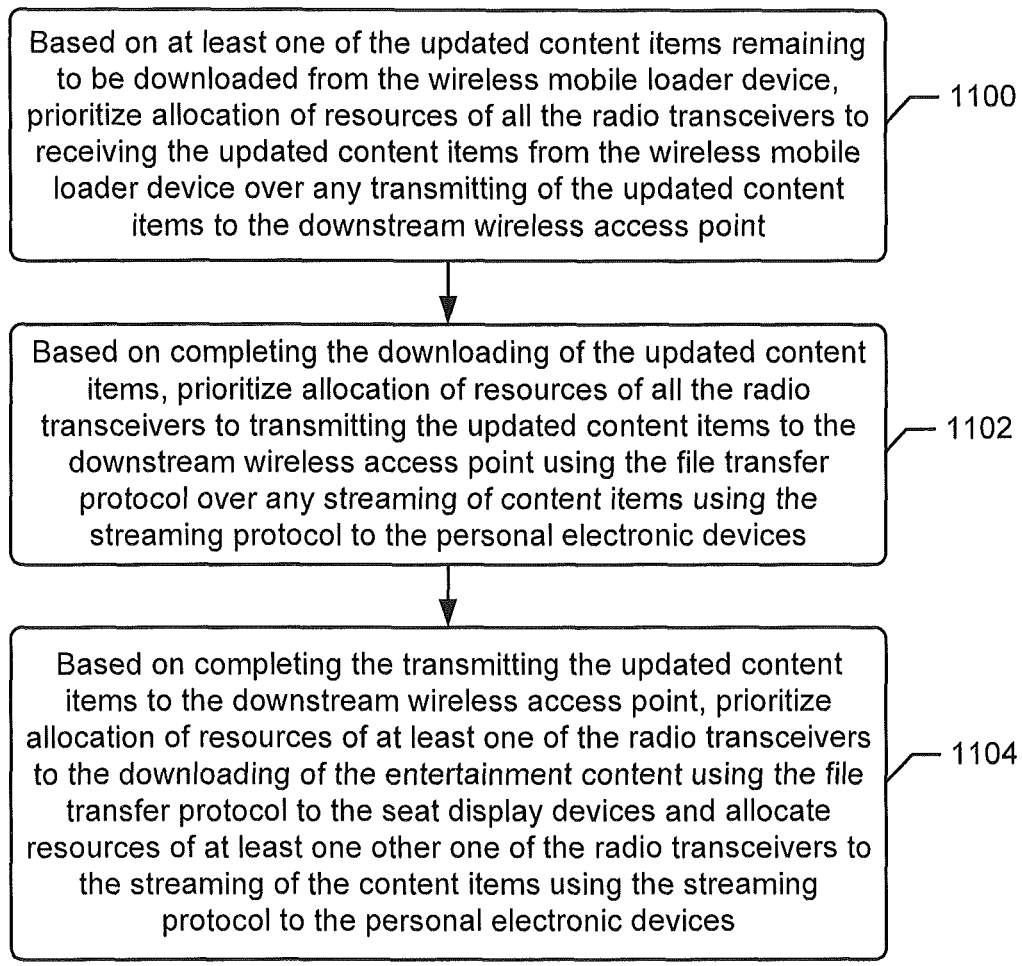

In the embodiment of FIG. 11, when each of the SWAPs 110 includes a plurality of the radio transceivers 520 (e.g., as shown in FIG. 5 by radio transceivers 520a . . . n), the processor 500 of at least some of the SWAPs 110 is further configured to, based on at least one of the updated content items remaining to be downloaded from the wireless mobile loader device 120, prioritize (block 1100) allocation of resources of all the radio transceivers 520 to receiving the updated content items from the wireless mobile loader device 120 over any transmitting of the updated content items to the downstream SWAP 110. The processor 500 may further preclude or prioritize the downloading over any distribution of content items to the seat display devices 114 and/or the personal electronic devices 116.

Based on completing the downloading of the updated content items, the processor 500 then prioritizes (block 1102) allocation of resources of all the radio transceivers 520 to transmitting the updated content items to the downstream SWAP 110 using the file transfer protocol over any streaming of content items using the streaming protocol to the personal electronic devices 116.

Based on completing the transmitting the updated content items to the downstream wireless access point, the processor 500 then prioritizes (block 1104) allocation of resources of at least one of the radio transceivers to the downloading of the entertainment content using the file transfer protocol to the seat display devices 114 and allocation of resources of at least one other one of the radio transceivers to the streaming of the content items using the streaming protocol to the personal electronic devices 116.

The flight crew can monitor and control operation of the IFE system 100 through one or more wireless electronic devices 122 (e.g., laptop computers or tablet computers with wireless communication capability).

The SWAPs 110 and the seat display devices 114 can be powered by the aircraft power system or by one or more centralized power supplies 130.

As explained above, the processor of one of the SWAPs 110 may download all or at least selected ones of the updated content items to another downstream one of the SWAPs 110.

SWAP Management of Wireless Networks

While content items are being loaded from the wireless loader device 120 to a SWAP 110, other communications, including distribution of content items from the SWAP 110 to the seat display devices 114, can be disabled or relegated to a lower priority of operational handling in order to maximize available wireless communication resources that are available for use in the communications from the wireless loader device 120 to the SWAP 110.

In another embodiment, a SWAP 110 includes a communication interface configured to communicate with a content loader device through a physical wired data communication interface (e.g., Gigabit Ethernet, USB, etc.).

Sharing Content Between Seat Display Devices

Two or more seat display devices 114 may be interconnected by a wired network 122 (e.g., thin wire Ethernet, etc.) that allows transfer of content items from one of the seat display devices 114 to the other one or more of the seat display devices. For example, one seat display device 114 may receive content items from a SWAP 110 which it then distributes to one or more other seat display devices 114 that are adjacent within its row of passenger seats. The wired network 122 can be used for real-time streaming of content items or non-real-time transfer of files for each of the content items from one seat display device 114 to an adjacent seat display device 114.

Additionally or alternatively, the content items may be distributed across a direct wireless communication link, which is not relayed through the SWAP 110. Example direct wireless communication links that may be used can include, but are not limited to, wireless USB and/or direct WIFI for real-time streaming of content items or non-real-time file transfer of content items over short distances (e.g., between seat display device 114 attached to adjacent passenger seats).

In one embodiment, a plurality of the seat display devices 114 are grouped (e.g., grouped by seating rows within an aircraft) with one of the seat display devices 114 in each of the groups operating as a master device and the other seat display devices 114 in each of the groups operating as slave devices. The seat display devices 114 can include at least one radio transceiver, a processor, a mass memory, and a wired network interface. The master device communicates with the slave devices in the same group through the wired network interface via a wired network 122, wherein the wired networks of each of the groups are not directly communicatively connected.

Figure 12:
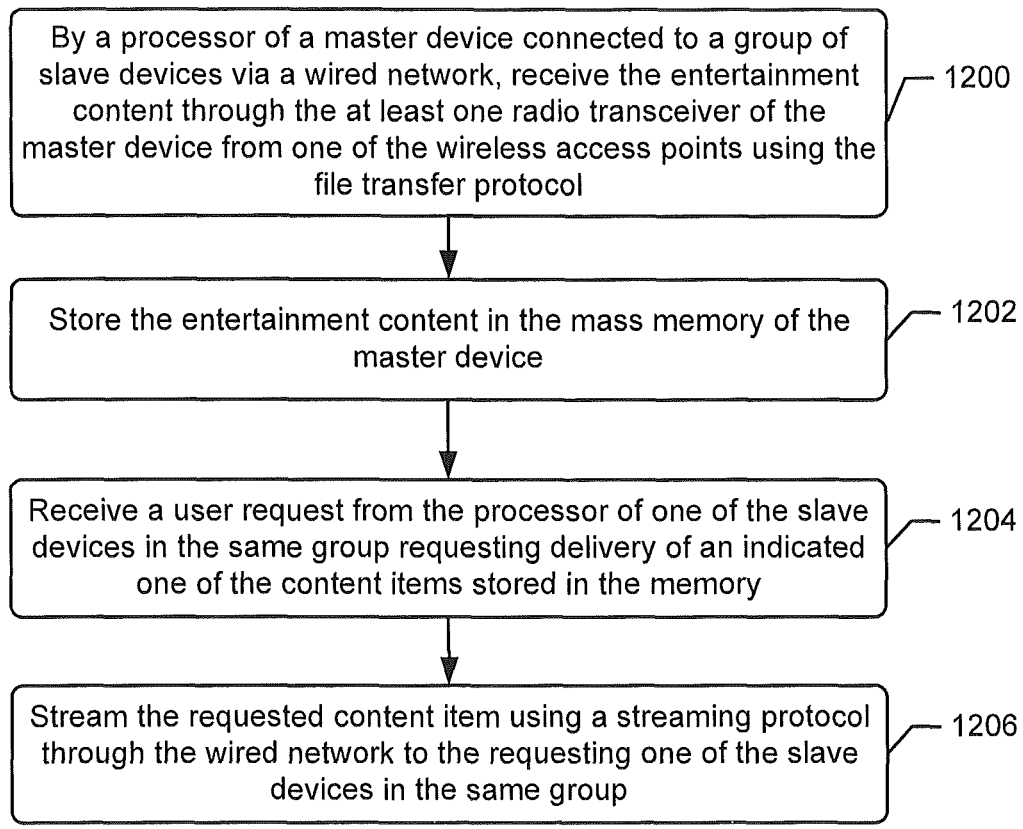

Referring to the embodiment of FIG. 12, the processor of the master device is configured to receive (block 1200 the entertainment content through the at least one radio transceiver of the master device from one of the SWAPs 110 using the file transfer protocol, to store (block 1202) the entertainment content in the mass memory of the master device, to receive (block 1204) a user request from the processor of one of the slave devices in the same group requesting delivery of an indicated one of the content items stored in the memory, and to stream (block 1206) the requested content item using a streaming protocol through the wired network interface and the wired network to the requesting one of the slave devices in the same group.

Controlling RF Channels Based on the Operational State of the System

A SWAP 110 can include a plurality of radio transceivers, each configured to communicate within a different frequency band. In one embodiment, the SWAPs 110 each have three radio transceivers. For example two of the radio transceivers can operate at 2.4 GHz and 5 GHz to provide increased communication bandwidth for transferring content to seat display devices 114. The third radio transceiver can be used for real-time steaming of radio audio, live TV channels, or other programming from a SWAP 110 to seat display devices 114. All three radios can be used simultaneously when loading content items from the wireless loader device 120 to a SWAP 110 and/or to transfer content from one SWAP 110 to another SWAP 110 within the aircraft. Similarly, all three radios can be used simultaneously when loading content items from a SWAP 110 into one or more display devices 114 for subsequent playing.

During flight after content items have been loaded from the loader device 120 to the SWAPs 110, communication resources of the radio transceivers can be shared between streaming content items to the PEDs 116, loading content items onto the seat display devices 114, and providing passenger services (e.g., attendant call notification messages, controlling overhead reading lights, communicating passenger announcements, etc.).

FIG. 2 illustrates wireless communication coverage areas 210, 212, 214 provided by three conventional WAPs within an aircraft fuselage 200. As illustrated, the coverage areas 210, 212, 214 substantially overlap which requires use of different frequency bands by the overlapping WAPs to avoid excessive interference between their communications and associated degraded data bandwidth with higher error rates.

FIG. 3 illustrates the operation of three SWAPs that are configured to provide substantially non-overlapping coverage areas 300, 302, 304 in accordance with some embodiments of the present disclosure. FIG. 4 illustrates the operation of seven SWAPs that are configured to provide substantially non-overlapping coverage areas 400, 402, 404, 406, 408, 410, 412 in a dense communication environment (e.g., within a Boeing 777 aircraft having a large number of seats) in accordance with some embodiments of the present disclosure.

The SWAPs 110 can have radio transceivers and associated antennas that are controlled by operations that provide substantially non-overlapping service areas. The operations may include dynamically controlling transmitter power by one SWAP 110 based on received signal feedback from an adjacent SWAP 110. The operations may alternatively or additionally include avoiding use of particular frequencies that are determined to contain excessive transmission interference from an adjacent SWAP 110. The operations may alternatively or additionally include dynamically controlling a modulation-coding scheme that one SWAP 110 applies to encode content data for transmission based on interference that it measures in signals transmitted by an adjacent SWAP 110.

The SWAPs 110 may communicate information between them through wireless or wired interfaces that cause the SWAPs 110 to coordinate assignment of identified seat display devices 114 and/or PEDs 116 to different ones of the SWAPs 110 to provide efficient and reliable servicing of seat display devices 114 and/or PEDs 116 near edge regions between the coverage areas.

For example, the SWAPs 110 are spaced apart in the aircraft fuselage 200 to create adjacent service areas in which entertainment services are provided to the seat display devices 114 and PEDs 116. A SWAP 110 can perform operations to determining which of the seat display devices 114 and PEDs 116 are located within near an edge of a service area or within an overlapping service area of an adjacent SWAP 110, and communicate an assignment message to the adjacent SWAP 110 to coordinate assignment of those seat display devices 114 and PEDs 116 to one or the other SWAP 110. A SWAP 110 can then adjust its transmitter power to expand or contract their coverage area to provide sufficient transmitter signal power (but not excessive transmitter signal power) to the seat display devices 114 and PEDs 116 that it is assigned to serve.

In a further embodiment, the SWAPs 110 may contain different locally stored content items, and may coordinate assignment of a seat display device 114 or PED 116 from a first SWAP 110 to an adjacent second SWAP 110 when the seat display device 114 or PED 116 requests a content item that is not present in local storage of the first SWAP 110 but is present in the local storage of the first SWAP 110. In this manner, the seat display device 114 or PED 116 can be handed off from the first SWAP 110 to the second SWAP 110 to receive the requested content item. Alternatively or additionally, the second SWAP 110 may transfer the requested content item through a wireless interface or a wired interface to the first SWAP 110 to enable the first SWAP 110 to provide the requested content item directly to the seat display device 114 or PED 116.

In one embodiment, each of the SWAPs 110 are configured to be mounted at spaced apart locations within an aircraft fuselage to provide entertainment services to passengers within the aircraft. The processor 500 of each of the SWAPs 110 is configured to perform antenna beam forming that increases transceiver 520 signal strength in a direction along the fuselage and reduces transceiver signal strength in a direction across the fuselage while the SWAPs 110 are mounted at the spaced apart locations within the aircraft fuselage.

The processor of each of the SWAPs 110 may be configured to coordinate with an adjacent one of the SWAPs 110 to determine which of a plurality of different frequency bands are allocated for use by the adjacent one of the wireless access points to reduce co-channel interference during their communications with seat display devices 114.

The processor of each of the SWAPs 110 may be configured to determine co-channel interference from an adjacent one of the SWAPs 110, and to control transmission power through the at least one radio transceiver 520 based on the co-channel interference.

The processor of each of the SWAPs 110 may be configured to measure interference from signals transmitted by an adjacent one of the SWAPs 110, and to control a modulation-coding scheme applied to encode entertainment content transmitted through the at least one radio transceiver 520 based on the interference.

The processor 500 of each of the SWAPs 110 may be configured to measure signals transmitted by the personal electronic devices 116, and to coordinate with an adjacent one of the SWAPs 110 a determination, based on the measured signals, of which of the personal electronic devices 116 are assigned to which of the coordinating SWAPs 110 for the streaming of content items. Thus, adjacent SWAPs 110 may operate to coordinate the assignment of personal electronic devices 116 and/or seat display devices 114 for servicing by which of the adjacent SWAPs 110. Such coordinated assignment can be beneficial to reducing overlap between the coverage areas, such as shown by the reduced overlap of coverage areas in FIGS. 3 and 4.

Alternatively, the SWAPs 110 may select among the personal electronic devices 116 and/or the seat display devices 114 based signal measurements. For example, the processor 500 of a SWAP 110 may be configured to measure signals transmitted by the personal electronic devices 116 and/or the seat display devices 114, and determine, based on the measured signals, which of the personal electronic devices 116 and/or the seat display devices 114 it will service. This assignment approach may operate to reduce transmitted signal power levels and therefore reduce interference to concurrent communications occurring between other SWAPs 110 their serviced seat display devices 114 and/or personal electronic devices 116.

SWAP Configuration

FIG. 5 is a block diagram of a SWAP 110 that is configured according to some embodiments of the present disclosure. The SWAP 110 can be a self-contained device that includes at least one processor 500, a memory 510, one or more radio transceivers ("radio") 520a, 520b, . . . 520n, a power supply 530, and a connection interface 540. In at least one embodiment, a housing encloses these components, and may be configured to be mounted to a ceiling of a vehicle, such behind a protective liner within an aircraft fuselage or within an equipment compartment.

The processor 500 may include one or more data processing circuits, such as a general purpose and/or special purpose processor (e.g., microprocessor and/or digital signal processor) that may be collocated or distributed across one or more networks. The processor 500 is configured to execute computer readable program code in the memory 510, described below as a computer readable medium, to perform some or all of the operations and methods that are described herein for one or more of the embodiments.

The processor 510 can operate to provide a server function 502 to receive and store content items from a loader device and/or server device located in the aircraft, and to provide content items to the seat display devices 114 and PEDs 116 via the radio transceivers 520a, 520b, . . . 520n. The processor 510 provides a radio management function 504 that controls the radio transceivers 520a, 520b, . . . 520n to setup, maintain, and terminate communication links to the seat display devices 114 and PEDs 116, and further operate to provide transmitter power management, transmitter/receiver frequency selection, antenna beam forming, and other operations disclosed herein for the SWAP 110 that can include coordinated operation between the SWAPs 110 to avoid interference therebetween.

A switch function 506 can operate to route data, including content items, commands, etc. through the network 546 of the connection interface 540 to provide operations described herein.

The memory 510 can be mass data storage device having sufficient data storage capacity to store a plurality of audio content (e.g., songs, etc.), audio-video content (e.g., movies, television programs, etc.), and/or games or other applications which can be downloaded to a video display device 114 for playback to and/or operation by a passenger. The memory 510 can be sufficiently large to store all movies, television shows, applications, and other content items that will be offered to passengers during flight.

The radio transceivers ("radio") 520a, 520b, . . . 520n may provide wireless RF communications to the seat display devices 114, and may further provide wireless communications with the wireless loader device 120. One or more of the radio transceivers ("radio") 520a, 520b, . . . 520n may operate according to a WiFi technologies such as 802.11n, 802.11ac, etc, and/or a cellular transceiver that operates according to one or more cellular radio access technologies that may include, but are not limited to, wideband-Code Division Multiple Access (CDMA), CDMA2000, Universal Mobile Telecommunications System (UMTS), and/or 3rd Generation Partnership Project (3GPP) Long Term Evolution (LTE).

The connection interface 540 can include a power interface 542, a discrete signal interface 544, and may further include network interface 546. The power interface 542 is connected to receive power from a centralized power supply 130 of the aircraft, which is further converted and conditioned by a power supply 530. The discrete signal interface 544 is connected to receive aircraft/crew control signals and may receive public announcement audio which is relayed to the seat display devices 114 for playback to passengers.

The network interface 546 may be a thin wire Ethernet or other wired network connection and/or a wireless RF transceiver that operates to interconnect the SWAPs 110 to allow shared control of their respective service area sizes to avoid unnecessary overlap, such as by provide feedback from one SWAP to an adjacent SWAP of measured interference caused by the adjacent SWAP and/or to enable coordinate of transmitter power levels to reduce/avoid interference therebetween, and/or to allow a SWAP 110 to adjust its direction antenna beam forming to reduce/avoid interference to an adjacent SWAP 110 and/or to compensate for interference from the adjacent SWAP 110. The SWAPs 110 may communicate with each other to exchange information enabling operation to coordinate allocation of transmit and/or receive frequencies between adjacent SWAPs 110 to reduce/avoid communication interference therebetween. The SWAPs 110 may communicate with each other to exchange information enabling coordinated assignment of identified seat display devices 114 and/or PEDs 116 to different ones of the SWAPs 110 to provide efficient and reliable servicing of seat display devices 114 and/or PEDs 116 near edge regions between the coverage areas.

The network interface 546 may connect to overhead display devices (e.g., ceiling mounted displays) to allow transfer of video content from the SWAP 110 for display on the overhead display devices. The network interface 546 can include a physical wired data communication interface (e.g., USB) configured to communicate with a wired content loader device 120 to receive content.

The network interface 546 may connect to one or more content servers to receive content items that are then locally stored for subsequent download as a group of content items to the seat display devices 114 for subsequent selection among by passengers, or downloaded on-demand to one of the seat display devices 114 responsive to a passenger selection of an individual content item.

The electronic components illustrated in FIG. 5 can be enclosed within a shared housing that is installed in a ceiling of the aircraft fuselage 200. Accordingly, a plurality of the SWAPs 110 can be deployed in the aircraft fuselage 200 by installing the separate housings at spaced part locations, such as within ceiling bays.

Prioritizing Use of SWAP Communication Resources

As explained above, SWAPs 110 provide a communication pathway for installing content items from an external source (loader device 120) to the seat display devices 114. The content items can be loaded onto a SWAP 110 over a wired or wireless link from a loader device 120, and then downloaded from the SWAP 110 to the seat display devices 114 over the wireless link 112, which may be the same link used to load the content items from the loader device 120. Operations for downloading content items from a SWAP 110 to the seat display devices 114 can be performed as a maintenance level background task as the content items are being loaded to the SWAP 110 from loader device 120. Accordingly, communication resources and processing operations for loading content items from the loader device 120 to the SWAP 110 can be provided a higher priority of operation than for loading content items from the SWAP 110 to the seat display devices 114. Upon completion of the transfer of content items from the loader device 120 to the SWAP 110, any ongoing transfer of content items from the SWAP 110 to the seat display devices 114 can be increased in operational priority, e.g., from the maintenance level background task to a non-maintenance level background task (e.g., because no human intervention is required). The communication resources and processing operations can then be prioritized for use in transferring content to the seat display devices 114.

The SWAP 110 can also provide content streaming capabilities to PEDs 116, such as explained herein. From the client standpoint, the SWAPs 110 are configured to appear as a compound content repository, because the client does not know where to stream content from, and which is abstracted by the SWAPs 110.

Content Management by the SWAPs to Provide a Dynamic Content Library for the Seat Display Devices and/or the Personal Display Devices Based on Defined Rules The operations for selecting among available content items within a SWAP 100 for download to particular seat display devices 114 and/or for streaming to personal electronic devices 116, and/or for controlling which content items are maintained at particular seat display devices 114, can be dynamically controlled based on one or more defined rules, which can include or not limited to:

popularity of different content items that are observed over time (e.g., track which content items have been used by passengers on seat display devices 114 to determine popularity of different content items, and control distribution of individual ones of the content items from the SWAPs 100 to the mass memory of the seat display devices 114 based on the respective popularity of the content items);

flight routes (e.g., load different content items into mass memory of display devices 114 for outgoing routes versus return routes); and control which content items are downloaded to the seat display devices 114 based on known primary languages of the originating region of a flight leg and/or destination region of a flight leg.

For example, the SWAPs 110 can contain substantially more content storage space than the seat display devices 114. In one non-limited example, the SWAPs 110 may have 600 GB of data storage capacity and the seat display devices 114 may have 100 GB of data storage capacity. If three SWAPs 110 are installed within the aircraft as part of the IFE system 100, there is potentially 1.8 TB of data storage capacity available to each of the seat display devices 114.

In some embodiments disclosed herein, the SWAPs 110 operate to provide dynamic content library management that can include after each flight, the SWAPs 110 will delete some of the content items in the seat display devices 114 and replace those content items with other content items available in the SWAPs 110. The selection of which content items to delete and which content items to install (which is not necessarily a one-for-one substitution) can be based on one or more of the rules defined herein.

The SWAPs 110 may operate to cooperatively manage the sharing of entertainment content between them so that their individual storage capacities function as a combined storage capacity for providing entertainment content to the seat display devices 114.

In some embodiments, different SWAPs 110 within an aircraft be loaded with at least some different entertainment content items, such as different movies, different television programming, different applications (e.g., games), etc. Some content items that are expected to be more often selected by passengers for streaming through the personal electronic devices 116 may be loaded onto each of the SWAPs 110, while other content items which may be expected to be less popular may be distributed without repetition across the SWAPs 110.

When a particular SWAP 110 is servicing a seat display device 114 or a personal electronic device 116 needs to download or stream a particular content item (e.g., a particular movie title) that does not reside within its local mass memory 510, that SWAP 110 can identify another SWAP 110 containing the particular content item and either: 1) obtain the particular content item from the other SWAP 110 and forward it to the seat display device 114 or the personal electronic device 116; or 2) cause the seat display device 114 or the personal electronic device 116 to obtain the particular content item directly from the other SWAP 110.

These and other embodiments will now be described in the context of FIGS. 13 through 17.

Figure 13:
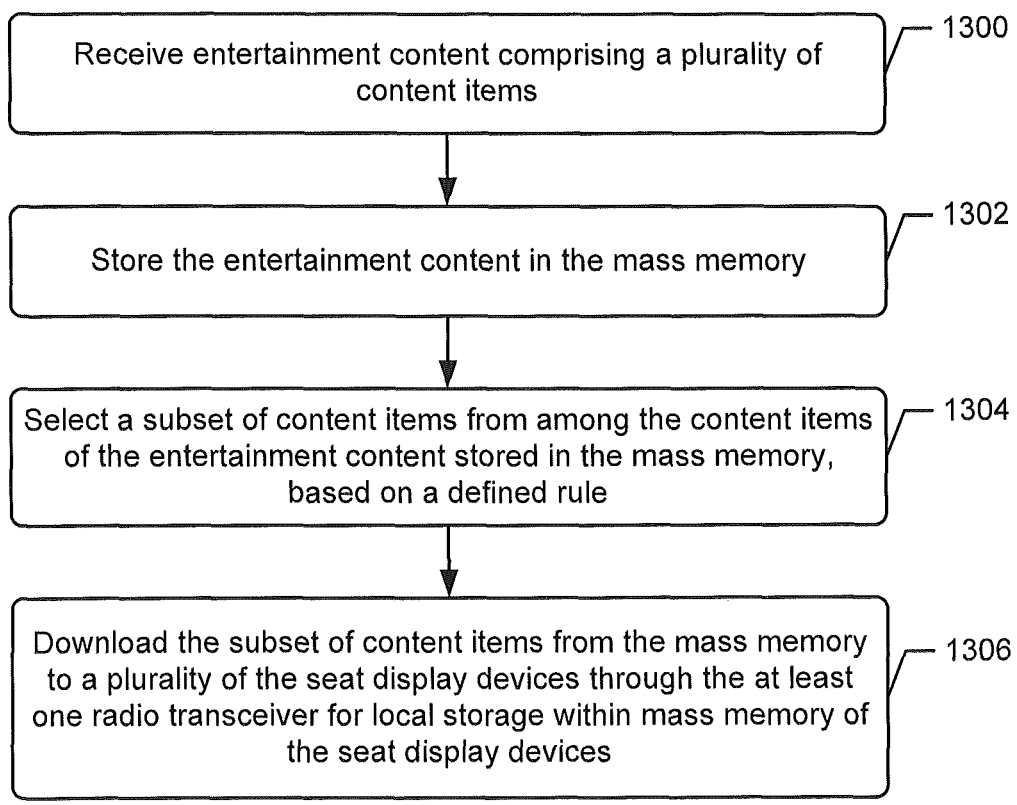

FIGS. 6-13 and 15-17 are flowcharts of operations and methods that may be performed by one or more SWAPs of an entertainment system in accordance with some embodiments of the present disclosure. Referring to FIG. 13, a SWAP 110 receives (block 1300) entertainment content comprising a plurality of content items, and stores (block 1302) the entertainment content in its local mass memory 510. The SWAP 110 selects (block 1304) a subset of content items from among the content items of the entertainment content stored in the mass memory, based on a defined rule. As explained herein, the defined rule can include making decisions based on popularity of different content items, other known passenger viewing preferences, flight routes, etc. The SWAP 110 then downloads (block 1306) the subset of content items from the mass memory 510 to a plurality of the seat display devices 114 through the at least one radio transceiver 520 for local storage within mass memory of the seat display devices 114.

As explained herein, the entertainment content can be distributed across the mass memory 510 of a plurality of the SWAPs 110. The SWAPs 110 can cooperatively operate to share information that enables the content items of any of the SWAPs 110 to be provided to any of the seat display devices 114 and/or personal electronic devices 116.

Figure 14:
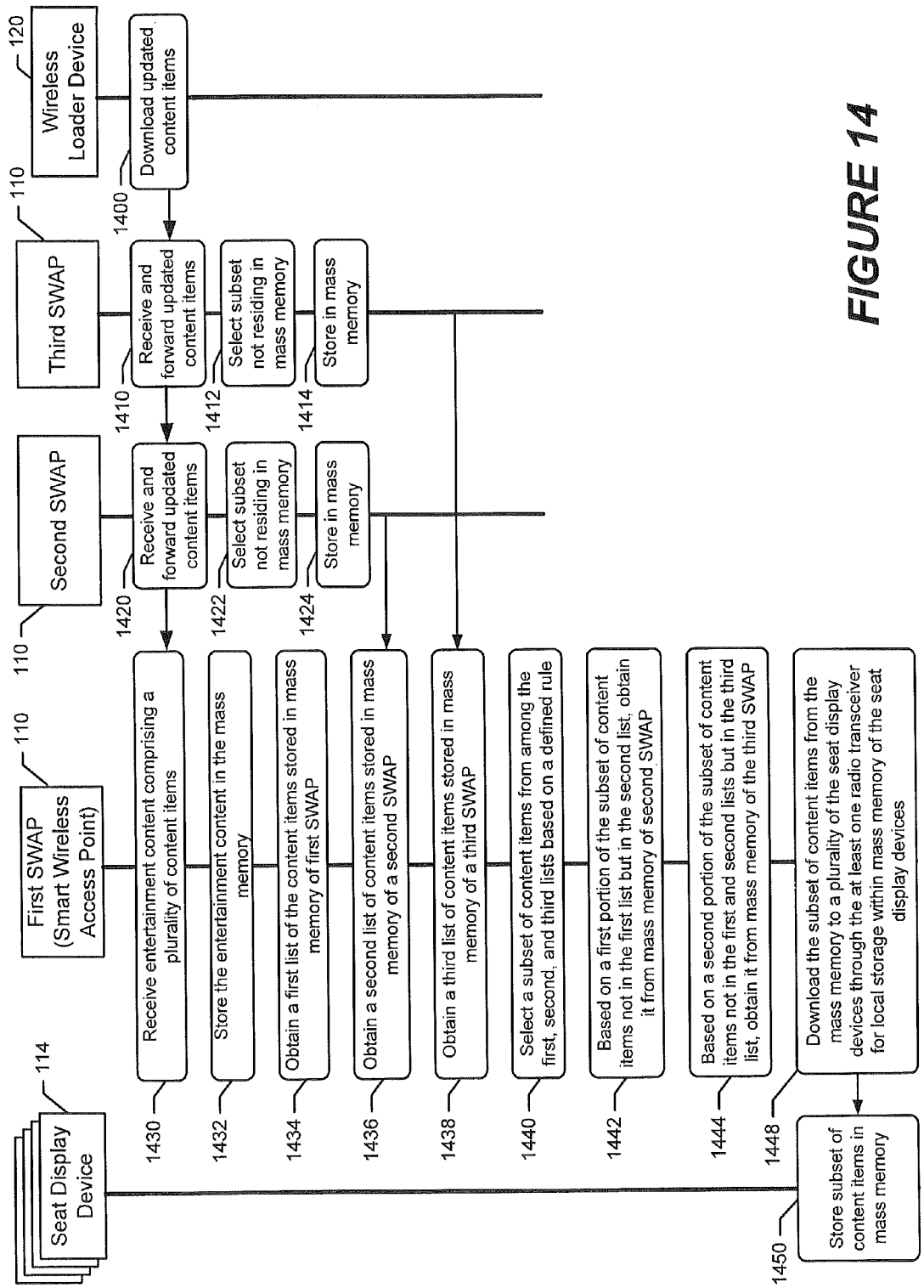
FIG. 14 illustrates data flows, operations, and methods that may be performed by a plurality of SWAPs, seat display devices, and a wireless data loader of an entertainment system in accordance with some embodiments of the present disclosure.
Figure 15:
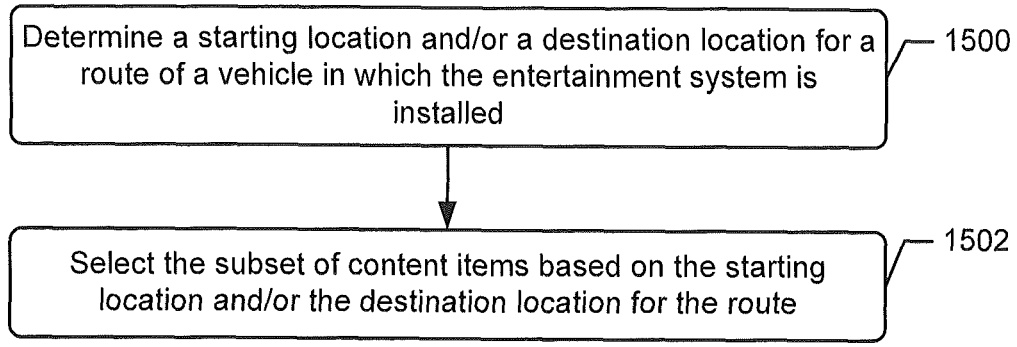

FIG. 14 illustrates data flows, operations, and methods that may be performed by a plurality of SWAPs 110, seat display devices 114, and a wireless data loader 120 of an entertainment system in accordance with some embodiments of the present disclosure. Referring to FIG. 14, the SWAPs 110 can be communicatively connected in a series through a wired network or through a wireless network. When the SWAPs 110 communicate content items between them through a wireless interface, connecting the SWAPs 110 in a serial fashion can avoid the need for any one of the SWAPs 110 to have a wireless service area that overlaps more than their immediately adjacent upstream and/or downstream SWAPs 110 in the series. Although three SWAPs 110 (first, second, third) are shown in FIG. 14 for simplicity of illustration and explanation of various operations, any number of SWAPs 110 may be included in the system.

The wireless loader device 120 downloads (block 1400) updated content items to the third SWAP 110 through a wireless connection (e.g., through the at least one radio transceiver 520) or through a wired network (e.g., network 546) using, for example, a file transfer protocol as described herein. The third SWAP 110 receives and forwards (block 1410) the updated content items to the second SWAP 110. The third SWAP 110 also selects (block 1412) a subset of the updated content items that do not yet reside in its local mass memory 510, and stores (block 1414) that subset in the mass memory 510. The third SWAP 110 may communicate a list to the second SWAP 110 indicating what subset of the updated content items the third SWAP 110 stored in its local mass memory 510 and/or indicating all of the content items that are presently stored in its local mass memory 510.

In one embodiment, the third SWAP 110 does not forward to the second SWAP 110 the subset of updated content items which it stored in its local mass memory 510. Accordingly, the third SWAP 110 can store as much of the updated content items as it has capacity for in the mass memory 510 and then forward the remaining updated content items to the second SWAP 110.

The second SWAP 110 receives and forwards (block 1420) the updated content items to the first SWAP 110. The second SWAP 110 also selects (block 1422) a subset of the updated content items that do not yet reside in its local mass memory 510, and stores (block 1424) that subset in the mass memory 510. The second SWAP 110 may select (block 1422) the subset of the updated content items that it will store in its local mass memory 510 based on the list from the third SWAP 110. The second SWAP 110 may, for example, attempt to avoid storing any of the updated content items that have been stored by the third SWAP 110 or store particular ones of the updated content items that satisfy a defined rule to avoid or reduce redundancy, of storage of content items with the third SWAP 110. The defined rule may be, for example, for the second SWAP 110 to store any content items having a threshold passenger viewing preferences rating and avoid redundant storage (with respect to the third SWAP 110) of any content items having less than the threshold passenger viewing preferences rating.

The second SWAP 110 may communicate a list to the first SWAP 110 indicating what subset of the updated content items the second SWAP 110 stored in its local mass memory 510 and/or indicating all of the content items that reside in its local mass memory 510.

The first SWAP 110 receives (block 1430) the updated content items, and selects a subset of the updated content items that do not yet reside in its local mass memory 510, and stores (block 1432) that subset in the mass memory 510. The first SWAP 110 may select the subset of the updated content items that it will store in its local mass memory 510 based on the combined lists from the second and third SWAP 110. The first SWAP 110 may, for example, attempt to avoid storing any of the updated content items that have been stored by the second and third SWAPs 110 or may store particular ones of the updated content items that satisfy a defined rule to avoid redundancy of content item with the third SWAP 110. The defined rule may be, for example, for the first SWAP 110 to store any content items having a threshold passenger viewing preferences rating and avoid redundant storage (with respect to the second and third SWAPs 110) of any content items having less than the threshold passenger viewing preferences rating.

Further example operations are now described in the context of being performed by the first SWAP 110 for managing content items distributed across the second and third SWAPs 110, although one or more of these operations may be additionally or alternatively performed by the second, third, and/or other SWAPs 110.

The first SWAP 110 identifies a download list of content items that it wants to download to the seat display devices 114 which it services through the one or more radio transceivers 520. The first SWAP 110 obtains (block 1434) a first list of the content items that are stored in its local mass memory 510. It also determines whether all of the content items in the download list are contained within the first list and, if so, it downloads those content items from the local mass memory 510 to those seat display devices 114.

However, when one or more of the content items in the download list are not contained in the first list, the first SWAP 110 obtains (block 1436) a second list of content items that are stored in the local mass memory 510 of the second SWAP 110 and obtains (block 1438) a third list of content items are stored in the local mass memory 510 of the third SWAP 110. The first SWAP 110 selects a subset of content items from among the first, second, and third list based on a defined rule.

Based on a first portion of the subset of content items not being the first list but being in the second list, the first SWAP 110 obtains (block 1442) the first portion from the local mass memory 510 of the second SWAP 110. Similarly, based on a second portion of the subset of content items not being the first and second lists but being in the third list, the first SWAP 110 obtains (block 1444) the first portion from the local mass memory 510 of the third SWAP 110. The SWAP 110 downloads (block 1448) the combined subset of content items to the plurality of the seat display devices 114 which it is servicing through the at least one radio transceiver 520. The seat display devices 114 receive and locally store (block 1450) the subset of content items in their local mass memories.

In another embodiment, instead of the first SWAP 110 downloading the first and second portions of the subset of content items from the second and third SWAPs 110 (which portions are not present in the mass memory 510 of the first SWAP 110) for local storage in the mass memory of the first SWAP 110 and subsequent downloading to the seat display devices 114 and/or streaming to passenger personal electronic devices, the first SWAP 110 may operate as a communication router that routes requests from the seat display devices 114 and/or passenger electronic devices 116 to the second SWAP 110 and/or third SWAP 110 containing the requested content items.

The content items can be dispersed across the mass memories of a plurality of SWAPs 110 and streamed from one SWAP 110 through another SWAP 110. In one example, the requested content items can be downloaded and/or streamed from the mass memory of the second SWAP 110 and/or third SWAP 110 through the radio transceiver of the first SWAP 110 to the requesting one(s) of the seat display devices 114 and/or passenger electronic devices 116. The first SWAP 110 may temporarily buffer packets of a content item being downloaded and/or streamed from another SWAP 110 through the radio transceiver of the first SWAP 110 to a seat display device 114 and/or passenger electronic device 116. However, in at least one embodiment, the first SWAP 110 would not permanently store the packets of the downloaded and/or streamed content item in its local mass memory. In another embodiment, the first SWAP 110 can respond to a determination that a content item which is not locally stored in its mass memory has satisfied a defined rule (e.g., passenger viewing popularity) by permanently store the packets of the downloaded and/or streamed content item in its local mass memory in order to reduce loading on the network interconnecting the SWAPs 110 when future requests for the content item are received by the first SWAP 110 from other seat display devices 114 and/or passenger electronic devices 116.

In one embodiment, the at least one processor of a first SWAP 110 is configured to respond to a request from a requesting one of the seat display devices 114 for one of the content items that does not reside in the mass memory of the first SWAP 110 but does reside in the mass memory of a second SWAP 110, by downloading the one of the content items from the mass memory of the second SWAP 110 to the requesting one of the seat display devices 114 through the at least one radio transceiver of the first SWAP 110.

In another embodiment, the at least one processor of a first SWAP 110 is configured to respond to a request from a requesting one of the personal electronic devices 116 for one of the content items that does not reside in the mass memory of the first SWAP 110 but does reside in the mass memory of a second SWAP 110, by streaming the one of the content items using a streaming protocol from the mass memory of the second SWAP 110 to the requesting one of the personal electronic devices 116 through the at least one radio transceiver of the first SWAP 110.

In another embodiment, the at least one processor of one of the SWAP 110 is further configured to, based on a defined rule, download the subset of content items using a file transfer protocol from the mass memory of two or more of the SWAP 110 to the plurality of the seat display devices 114 through the at least one radio transceiver. The at least one processor furthermore streams individual content items using a streaming protocol from the mass memory of one or more of the SWAPs 110 to personal electronic devices of users through the at least one radio transceiver responsive to corresponding individual on-demand playback requests received from the personal electronic devices 116 operated by the users.

In another embodiment, instead of the first SWAP 110 obtaining the first and second portions of the subset of content items from the second and third SWAPs 110 (which portions are not present in the mass memory 510 of the first SWAP 110) for forwarding to the seat display devices 114 it services, the first SWAP 110 may cause the seat display devices 114 to establish direct communications with the second SWAP 110 and the third SWAP 110 to receive the first and second portions of the subset of content items directly therefrom. The first SWAP 110 may, for example, download a portion of the subset of content items available in its mass memory 510 to the seat display devices 114 and then provide a handoff instruction to the seat display devices 114 and/or to the second and third SWAPs 110 to allow the first and second portions of the subset of content items to be obtained therefrom.

Causing the seat display devices 114 to obtain these portions direction from the second and third SWAPs 110 can reduce the burden on the network(s) which interconnect the SWAPs 110, which may be particularly advantageous when transferring content items between SWAPs 110 uses the same resources of the radio transceivers 520 that are used to download content items to the seat display devices 114 and/or that are used to stream content items to the personal electronic devices 116.

Each of the SWAPs 110 can determine the subset of content items, which are available within its local mass memory 510 or distributed across the mass memory 510 of a plurality of the SWAPs 110, to be downloaded to the seat display devices 114 based on one or more defined rules. Referring to the flowchart of FIG. 15, a SWAP 110 can determine (block 1500) a starting location and/or a destination location for a route of a vehicle in which the entertainment system is installed. When installed in an aircraft, the starting location can be the departure airport and the destination location can be the destination airport. Alternatively, the starting and destination locations may refer to a city, region or country. The SWAP 110 then selects (block 1502) the subset of content items based on the starting location and/or the destination location for the route.

Figure 16:
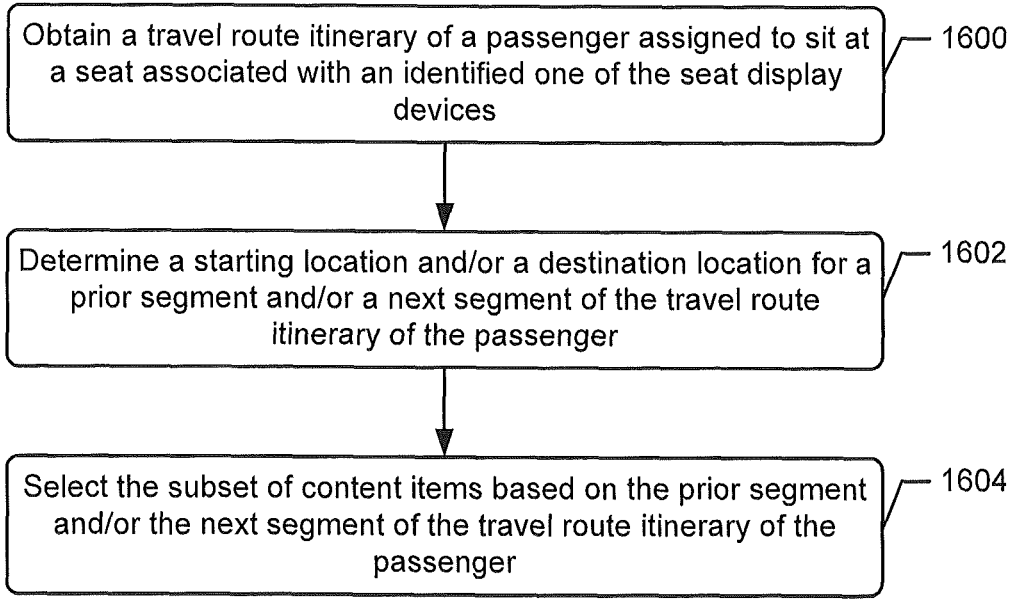
Figure 17:
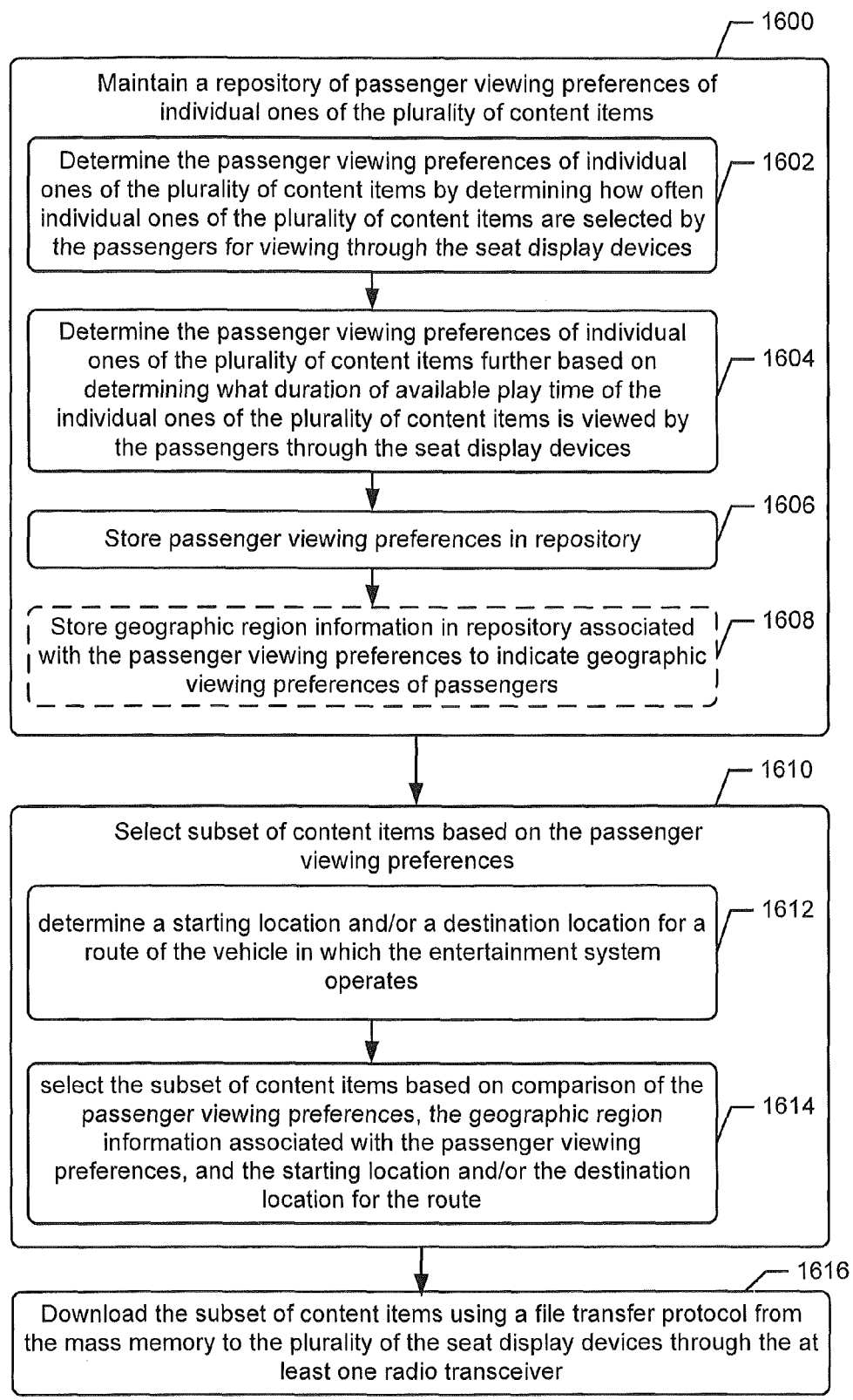

In another embodiment of FIG. 16, a SWAP 110 can obtain (block 1600) a travel route itinerary of a passenger assigned to sit at a seat associated with an identified one of the seat display devices, and can determine (block 1602) a starting location and/or a destination location for a prior segment and/or a next segment of the travel route itinerary of the passenger. The SWAP 110 can then select (block 1604) the subset of content items based on the prior segment and/or the next segment of the travel route itinerary of the passenger.

A SWAP 110 may additionally or alternatively determine which of the content items to download to the seat display devices 114 based on passenger viewing preferences that been observed by the SWAP 110 or another component of the entertainment system, or that have been provided to the SWAP 110 from a component outside the entertainment system. Referring to the embodiment of FIG. 17, a SWAP 110 maintains (block 1600) a repository of passenger viewing preferences of individual ones of the plurality of content items, selects (block 1610) the subset of content items based on the passenger viewing preferences, and downloads (block 1616) the subset of content items using a file transfer protocol from the mass memory 510 and/or from other SWAPs 110 to the plurality seat display devices 114 which the SWAP 110 services through the at least one radio transceiver 520.

More particularly, the SWAP 110 may determine (block 1602) the passenger viewing preferences of individual ones of the plurality of content items by determining how often individual ones of the plurality of content items are selected by the passengers for viewing through the seat display devices. Alternatively or additionally, the SWAP 110 may determine (block 1604) the passenger viewing preferences of individual ones of the plurality of content items further based on determining what duration of available play time of the individual ones of the plurality of content items is viewed by the passengers through the seat display devices.

The SWAP 110 stores (block 1606) the passenger viewing preferences in a repository located in a memory that may be within the SWAP 110, or a repository located external to the SWAP 110 to function as a centralized repository of passenger viewing preferences gathered by all of the SWAPs 110 within the aircraft or other vehicle. One SWAP 110 may operate a master collector of passenger viewing preferences observed by all of the SWAPs 110, and be responsible for storing the collected preferences in the repository.

The SWAP 110 may store geographic region information in the repository associated with the passenger viewing preferences to indicate geographic viewing preferences of passengers. For example, the repository may contain information that indicates differences in the passenger viewing preferences between different origination/destination cities, between different origination/destination regions of a country, or between different origination/destination countries.

To select the subset of content items based on passenger viewing preferences, the SWAP 110 may determine (block 1612) a starting location and/or a destination location for a route of the vehicle in which the entertainment system operates, and select (block 1614) the subset of content items based on comparison of the passenger viewing preferences, the geographic region information associated with the passenger viewing preferences, and the starting location and/or the destination location for the route.

Then, as explained above, the SWAP 110 obtains the content items within that subset from its local mass memory 510 and/or from the mass memory 510 of other SWAPs 110, as needed based on where the content items are available, and downloads (block 1616) the subset of content items using a file transfer protocol from the mass memory 510 to the plurality seat display devices 114 which the SWAP 110 services through the at least one radio transceiver 520.

Although various operations by SWAPs for content distribution and management have been disclosed in the context of providing downloading of content items to seat display devices 114, the SWAPs may additionally or alternatively stream individual content items using a streaming protocol from the mass memory to personal electronic devices 116 of passengers or other users through the at least one radio transceiver 520 responsive to corresponding individual on-demand playback requests received from the personal electronic devices 116 operated by the passengers.

Thus, for example, a first SWAP 110 may communicate a list of content items to a group of personal electronic devices 116 that it services (e.g., which operate within the service area of the particular SWAP), where the list may be generated without limitation to only the particular content items available within its local mass memory 510 but instead can include content items that are available from other SWAPs (e.g., the second and third SWAPs 110). When the first SWAP 110 receives a streaming request from a personal electronic device 116 for a content item that is not contained within its local mass memory 510, the first SWAP 110 can obtain (e.g., download using a file transfer protocol) the requested content item from another SWAP 110, store the requested content item in the local mass memory 510 of the first SWAP, and then stream the requested content item to the personal electronic device 116.

In an alternative embodiment, the first SWAP 110 may cause the other SWAP 110 to stream the requested content item from the other SWAP's 110 local mass memory 510 through the network (e.g., wired network 546 or wireless network 520) to the first SWAP 110 and therethrough streamed to the personal electronic device 116.

In a further alternative embodiment, the first SWAP 110 may cause the personal electronic device 116 to be handed off to the other SWAP 110 to establish direct communications between the personal electronic device 116 and the other swap 110 having the requested content item. The other SWAP 110 can then stream the requested content item directly to the personal electronic device 116. Accordingly, the first SWAP 110 may use its knowledge of which of the available SWAPs 110 contains a content item requested by a particular personal electronic device 116 to control handoff of the particular personal electronic device 116 to one of the SWAPs 110 which has the requested content item within its local mass memory 510.

As explained above, SWAPs 110 can manage how resources of their at least one radio transceiver 520 are used to load content items into the mass memory 510, to move content items between SWAPs 110, to download content items to the seat display devices 114, and/or to stream content items to the personal electronic devices 116. In one embodiment, a SWAP 110 prioritizes use of resources of the at least one radio transceiver 520 to performing the downloading of the updated content items from the wireless mobile loader device 120 and to performing the transmission of the updated content items to the downstream one of the SWAPs 110, over use of the resources of the at least one radio transceiver 520 for concurrent downloading of the subset of content items from the mass memory 510 to the seat display devices 114.

When each of the SWAPs 110 includes a plurality of the radio transceivers (e.g., radio transceivers 520a, 520b, . . . 520n), the processor(s) 500 of at least one of the SWAPs 110 is further configured to, based on at least one of the updated content items remaining to be downloaded from the wireless mobile loader device 120, prioritize use of the resources of all the radio transceivers 520 to receiving the updated content items from the wireless mobile loader device 520 over any transmitting of the updated content items to the downstream one of the SWAPs 110.

Based on completing the downloading of the updated content items, the processor(s) 500 prioritizes use of the resources of all the radio transceivers 520 to transmitting the updated content items to the downstream one of the SWAPs 110 using the file transfer protocol over streaming of any of the content items using a streaming protocol to the personal electronic devices 116 through the SWAPs 110.

Based on completing the transmitting the updated content items to the downstream one of the SWAPs 110, the processor(s) 500 prioritizes use of the resources of at least one of the radio transceivers (e.g., transceivers 520a and 520b) to the downloading of the subset of content items using a file transfer protocol to the seat display devices 114 and prioritizes use of the resources of at least one other one of the radio transceivers (e.g., transceiver 520m and 520n) to the streaming of individual ones of the content items using the streaming protocol to the personal electronic devices 114 responsive to corresponding individual on-demand playback requests received from the personal electronic devices 114 operated by the passengers.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. An entertainment system comprising:
a wireless access point comprising: a mass memory; at least one radio transceiver configured to communicate with seat display devices; and
at least one processor configured to: receive entertainment content comprising a plurality of content items;
store the entertainment content in the mass memory;
select a subset of content items from among the content items of the entertainment content stored in the mass memory, based on a defined rule; and
download the subset of content items from the mass memory to a plurality of the seat display devices through the at least one radio transceiver for local storage within mass memory of the seat display devices; wherein: the entertainment system comprises a plurality of the wireless access points communicatively connected to each other through a network; the at least one processor of a first one of the wireless access points is configured to:
obtain a first list of the content items stored in the mass memory of the first wireless access point;
obtain a second list of content items stored in the mass memory of a second one of the wireless access points;
select the subset of content items from among the first and second lists based on the defined rule; and
based on a first portion of the subset of content items not being present in the first list but present in the second list, obtain the first portion of the subset of content items from the mass memory of the second wireless access point through the network for download to the plurality of the seat display devices through the at least one radio transceiver of the first wireless access point for local storage within the mass memory of the seat display devices.

2. The entertainment system of claim 1, wherein:
the entertainment system comprises a plurality of the wireless access points communicatively connected to each other through a network; and
the at least one processor of a first one of the wireless access points is configured to respond to a request from a requesting one of the seat display devices for one of the content items that does not reside in the mass memory of the first one of the wireless access points but does reside in the mass memory of a second one of wireless access points, by downloading the one of the content items from the mass memory of the second one of the wireless access points to the requesting one of the seat display devices through the at least one radio transceiver of the first one of the wireless access points.

3. The entertainment system of claim 1, wherein:
the entertainment system comprises a plurality of the wireless access points communicatively connected to each other through a network; and
the at least one radio transceiver is further configured to communicate with personal electronic devices of users; and
the at least one processor of a first one of the wireless access points is configured to respond to a request from a requesting one of the personal electronic devices for one of the content items that does not reside in the mass memory of the first one of the wireless access points but does reside in the mass memory of a second one of wireless access points, by streaming the one of the content items using a streaming protocol from the mass memory of the second one of the wireless access points to the requesting one of the personal electronic devices through the at least one radio transceiver of the first one of the wireless access points.

4. The entertainment system of claim 1, wherein the at least one processor of the first wireless access point is configured to:
obtain a third list of content items stored in the mass memory of a third one of the wireless access points; select the subset of items from among the first, second, and third lists based on the defined rule; and based on a second portion of the subset of content items not being present in the first and second lists but present in the third list, obtain the second portion of the subset of content items from the mass memory of the third wireless access point through the network for download to the plurality of the seat display devices through the at least one radio transceiver for local storage within mass memory of the seat display devices.

5. The entertainment system of claim 1, wherein:
each of the wireless access points is configured to be mounted at spaced apart locations within an aircraft fuselage to provide entertainment services to passengers within the aircraft.

6. The entertainment system of claim 1, wherein the plurality of wireless access points are communicatively connected in a series, wherein the at least one processor of at least one of the wireless access points is further configured to:
download updated content items from an upstream one of the wireless access points using a file transfer protocol; select a subset of the updated content items that does not reside in the mass memory of the wireless access point; store the subset of the updated content items in the mass memory; and forward the updated content items to a downstream one of the wireless access points using a file transfer protocol.

7. The entertainment system of claim 1, wherein the plurality of wireless access points are communicatively connected in a series, wherein the at least one processor of at least one of the wireless access points is further configured to:
download updated content items from a wireless mobile loader device using a file transfer protocol through the at least one radio transceiver;
select a subset of the updated content items that does not reside in the mass memory of the wireless access point; store the subset of the updated content items in the mass memory; and transmit the updated content items absent the subset of the updated content items to the downstream one of the wireless access points using a file transfer protocol.

8. The entertainment system of claim 1 wherein the plurality of wireless access points are communicatively connected in a series, wherein the at least one processor of at least one of the wireless access points is further configured to:
download updated content items from a wireless mobile loader device using a file transfer protocol through the at least one radio transceiver; select a subset of the updated content items that does not reside in the mass memory of the wireless access point;
store the subset of the updated content items in the mass memory; and
transmit at least some of the updated content items to the downstream one of the wireless access points using a file transfer protocol through the at least one radio transceiver; and
prioritize use of resources of the at least one radio transceiver to performing the downloading of the updated content items from the wireless mobile loader device and to the transmitting the updated content items to the downstream one of the wireless access points, over use of the resources of the at least one radio transceiver for concurrent downloading of the subset of content items from the mass memory to the plurality of the seat display devices.

9. The entertainment system of claim 8, wherein:
each of the wireless access points further comprises a plurality of the radio transceivers;
the at least one processor of at least one of the wireless access points is further configured to:
based on at least one of the updated content items remaining to be downloaded from the wireless mobile loader device, prioritize use of the resources of all the radio transceivers to receiving the updated content items from the wireless mobile loader device over any transmitting of the updated content items to the downstream one of the wireless access points;
based on completing the downloading of the updated content items, prioritize use of the resources of all the radio transceivers to transmitting the at least some of the updated content items to the downstream one of the wireless access points using the file transfer protocol over streaming of any of the content items using a streaming protocol to personal electronic devices of passengers through the wireless access points; and
based on completing the transmitting the at least some of the updated content items to the downstream one of the wireless access points, prioritize use of the resources of at least one of the radio transceivers to the downloading of the subset of content items using a file transfer protocol to the seat display devices and prioritize use of the resources of at least one other one of the radio transceivers to the streaming of individual ones of the content items using the streaming protocol to the personal electronic devices of passengers responsive to corresponding individual on-demand playback requests received from the personal electronic devices operated by the passengers.

10. The entertainment system of claim 1, wherein the at least one processor of the wireless access point is further configured to, based on the defined rule:
 determine a starting location and/or a destination location for a route of a vehicle in which the entertainment system is installed; and
 select the subset of content items based on the starting location and/or the destination location for the route.

11. The entertainment system of claim 1, wherein the entertainment system is configured to operate within a vehicle transporting passengers, and wherein the at least one processor of the wireless access point is further configured to, based on the defined rule:
 obtain a travel route itinerary of a passenger assigned to sit at a seat associated with an identified one of the seat display devices;
 determine a starting location and/or a destination location for a prior segment and/or a next segment of the travel route itinerary of the passenger; and
 select the subset of content items based on the prior segment and/or the next segment of the travel route itinerary of the passenger.

12. The entertainment system of claim 1, wherein the entertainment system is configured to operate within a vehicle transporting passengers, and the at least one processor of the wireless access point is further configured to:
 maintain a repository of passenger viewing preferences of individual ones of the plurality of content items; and
 select the subset of content items based on the passenger viewing preferences.

13. The entertainment system of claim 12, wherein the at least one processor of the wireless access point is further configured to:
 determine the passenger viewing preferences of individual ones of the plurality of content items by determining how often individual ones of the plurality of content items are selected by the passengers for viewing through the seat display devices.

14. The entertainment system of claim 13, wherein the at least one processor of the wireless access point is further configured to:
 determine the passenger viewing preferences of individual ones of the plurality of content items further based on determining what duration of available play time of the individual ones of the plurality of content items is viewed by the passengers through the seat display devices.

15. The entertainment system of claim 12, wherein the at least one processor of the wireless access point is further configured to:
 store geographic region information in the repository associated with the passenger viewing preferences to indicate geographic viewing preferences of passengers;
 determine a starting location and/or a destination location for a route of the vehicle in which the entertainment system operates; and
 select the subset of content items based on comparison of the passenger viewing preferences, the geographic region information associated with the passenger viewing preferences, and the starting location and/or the destination location for the route.

16. The entertainment system of claim 1, wherein:
 the entertainment system comprises a plurality of the wireless access points communicatively connected to each other through a network; and
 the at least one processor of one of the the wireless access points is further configured to, based on the defined rule:
  download the subset of content items using a file transfer protocol from the mass memory of two or more of the wireless access points to the plurality of the seat display devices through the at least one radio transceiver; and
  stream individual content items using a streaming protocol from the mass memory of one or more of the wireless access points to personal electronic devices of users through the at least one radio transceiver responsive to corresponding individual on-demand playback requests received from the personal electronic devices operated by the users.

17. A method by an entertainment system having a wireless access point that communicates with seat display devices, the method comprising:
 receiving, at the wireless access point, entertainment content comprising a plurality of content items;
 storing the entertainment content in a mass memory of the wireless access point;
 selecting a subset of content items from among the content items of the entertainment content stored in the mass memory, based on a defined rule; and
 downloading the subset of content items from the mass memory to the seat display devices through at least one radio transceiver of the wireless access point for local storage within mass memory of the seat display devices;
 wherein the entertainment system comprises a plurality of the wireless access points, including first and second wireless access points, communicatively connected to each other through a network, and the method further comprises:
 obtaining, by the first wireless access point, a first list of the content items stored in the mass memory of the first wireless access point;
 obtaining, by the first wireless access point, a second list of content items stored in the mass memory of a second one of the wireless access points;
 selecting the subset of content items from among the first and second lists based on the defined rule; and
 based on a first portion of the subset of content items not being present in the first list but present in the second list, obtaining by the first wireless access point the first portion of the subset of content items from the mass memory of the second wireless access point through the network for download to the plurality of the seat display devices through the at least one radio transceiver of the first wireless access point for local storage within the mass memory of the seat display devices.

18. The method of claim 17, wherein the entertainment system comprises a plurality of the wireless access points, including first and second wireless access points, communicatively connected to each other through a network, and the method further comprises:
 responsive to a request received at the first wireless access point from a requesting one of the seat display devices for one of the content items, determining that the one of the content items does not reside in the mass memory of the first wireless access point but does reside in the mass memory of the second wireless access point; and
 responsive to the determining, downloading the one of the content items from the mass memory of the second one of the wireless access points to the requesting one of the seat display devices through the at least one radio transceiver of the first wireless access point.

19. The method of claim 17, wherein the entertainment system comprises a plurality of the wireless access points, including first and second wireless access points, communicatively connected to each other through a network, the at least one radio transceiver is further configured to communicate with personal electronic devices of users, and the method further comprises:
responsive to a request received at the first wireless access point from a requesting one of the personal electronic devices for one of the content items, determining that the one of the content items does not reside in the mass memory of the first wireless access point but does reside in the mass memory of the second wireless access point; and
responsive to the determining, streaming the one of the content items using a streaming protocol from the mass memory of the second wireless access point to the requesting one of the personal electronic devices through the at least one radio transceiver of the first wireless access point.

20. The method of claim 17, further comprising:
determining a starting location and/or a destination location for a route of a vehicle in which the entertainment system is installed; and
selecting, by the first wireless access point, the subset of content items based on the starting location and/or the destination location for the route.

21. The method of claim 17, wherein the entertainment system is configured to operate within a vehicle transporting passengers, and the method further comprises:
obtaining a travel route itinerary of a passenger assigned to sit at a seat associated with an identified one of the seat display devices; determining a starting location and/or a destination location for a prior segment and/or a next segment of the travel route itinerary of the passenger; and
selecting, by the first wireless access point, the subset of content items based on the prior segment and/or the next segment of the travel route itinerary of the passenger.

22. The method of claim 17, wherein the entertainment system is configured to operate within a vehicle transporting passengers, and the method further comprises:
maintaining a repository of passenger viewing preferences of individual ones of the plurality of content items; and
selecting, by the first wireless access point, the subset of content items based on the passenger viewing preferences.

23. The method of claim 22, further comprising:
determining, by the first wireless access point, the passenger viewing preferences of individual ones of the plurality of content items by determining how often individual ones of the plurality of content items are selected by the passengers for viewing through the seat display devices and/or determining what duration of available play time of the individual ones of the plurality of content items is viewed by the passengers through the seat display devices.

24. The method of claim 23, further comprising:
storing geographic region information in the repository associated with the passenger viewing preferences to indicate geographic viewing preferences of passengers;
determining a starting location and/or a destination location for a route of the vehicle in which the entertainment system operates; and
selecting, by the first wireless access point, the subset of content items based on comparison of the passenger viewing preferences, the geographic region information associated with the passenger viewing preferences, and the starting location and/or the destination location for the route.

* * * * *